United States Patent
Foote et al.

(10) Patent No.: US 8,280,197 B1
(45) Date of Patent: Oct. 2, 2012

(54) MANAGED BACKGROUND LOADING OF IMAGE RESOURCES IN RESOURCE-CONSTRAINED DEVICES

(75) Inventors: William Foote, El Cerrito, CA (US); Alejandro Nijamkin, Simi Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/461,047

(22) Filed: May 1, 2012

Related U.S. Application Data

(60) Provisional application No. 61/605,084, filed on Feb. 29, 2012.

(51) Int. Cl.
*G06K 9/60* (2006.01)
(52) U.S. Cl. ........................................ 382/305
(58) Field of Classification Search .......... 358/2.1, 358/403–404; 382/100–108, 305–306; 707/821–831
See application file for complete search history.

(56) References Cited

U.S. PATENT DOCUMENTS

| | | | |
|---|---|---|---|
| 7,299,409 B2 | 11/2007 | Joshi et al. | |
| 7,555,638 B2 | 6/2009 | Li et al. | |
| 7,583,457 B2 | 9/2009 | Miller et al. | |
| 7,873,909 B2 | 1/2011 | Evans | |
| 7,929,523 B2 | 4/2011 | Shenfield et al. | |
| 2004/0052507 A1* | 3/2004 | Kondo et al. | 386/111 |
| 2007/0118550 A1 | 5/2007 | Yang et al. | |
| 2008/0144110 A1* | 6/2008 | Nakajima | 358/2.1 |

OTHER PUBLICATIONS

S. Armeli-Battana, "Sebastiano Armelia-Battana—Projects—JAIL", Aug. 2011, available at http://www.sebastianoarmelibattana.com/projects/jail (last visited May 1, 2012).
C. A. Cois, "Android Development Tutorial: Asynchronous Lazy Loading and Caching of ListView Images", Jun. 15, 2011, Codehenge.net, available at http://codehenge.net/blog/2011/06/android-development-tutorial-asynchronous-lazy-loading-and-caching-of-listview-images/ (last visited Apr. 6, 2012).
M. Johnson, "HJCache: iPhone Cache Library for Asynchronous Image Loading and Caching", Jan. 11, 2011, FocusedApps, available at http://www.markj.net/hjcache-iphone-image-cache/ (last visited Apr. 6, 2012).
Toxi, "Asynchronous Data/Image Loading", Dec. 29, 2010, processing.org, available at http://wiki.processing.org/w/Asynchronous_data/image_loading (last visted Apr. 6, 2012).

* cited by examiner

*Primary Examiner* — Atiba O Fitzpatrick
(74) *Attorney, Agent, or Firm* — McDonnell Boehnen Hulbert & Berghoff LLP

(57) ABSTRACT

Disclosed are apparatus and methods for loading images. A request can be received at a computing device to display a plurality of images on the computing device. In response to the request, the computing device can load, in parallel, the plurality of images into storage of the computing device. The computing device can determine whether an image of the plurality of images is to be used. In response to determining that the image is to be used, the computing device can mark the image as loaded. In response to determining that the image is to not be used, the computing device can mark the image as no-image. Only images marked as loaded can be provided for display.

20 Claims, 15 Drawing Sheets

400A (object view)

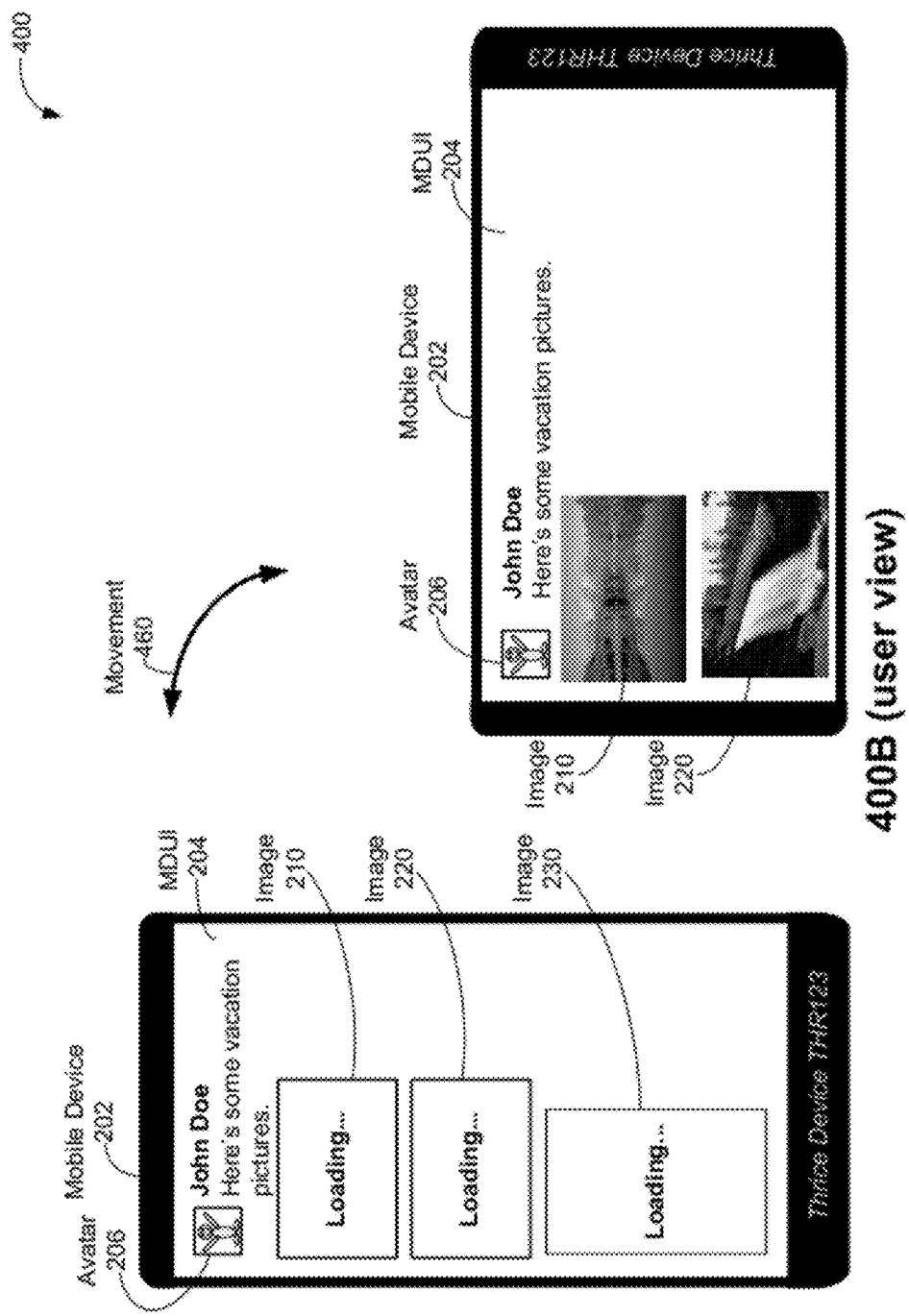

MANAGED BACKGROUND LOADING OF IMAGE RESOURCES IN RESOURCE-CONSTRAINED DEVICES

CROSS-REFERENCE TO RELATED APPLICATIONS

This application claims priority to U.S. Patent App. No. 61/605,084, filed Feb. 29, 2012, entitled "Managed Background Loading of Image Resources in Resource-Constrained Devices", which is incorporated herein by reference for all purposes.

BACKGROUND

Unless otherwise indicated herein, the materials described in this section are not prior art to the claims in this application and are not admitted to be prior art by inclusion in this section.

Modern operating systems can provide interfaces for various portions of a user interface. For example, typical operating systems provide support to load image, audio, and video data into memory, unload the same data from memory, and for displaying image data and/or playing audio and/or video data that is in memory. Operating system support can include specific support for image, audio, and/or video data and/or can be part of a general package for utilizing blocks of memory.

In some cases, the operating system can also provide support for memory management for executing applications. For example, the operating system can provide a run-time system, including a memory manager to support execution of software written in programming languages that frequently allocate and deallocate blocks of memory.

SUMMARY

In one aspect, a method is provided. An application executing on a computing device sends a request to load a plurality of image in parallel onto the computing device. An image loader executing on the computing device receives the request. In response to the request, the image loader loads, in parallel, the plurality of images into storage of the computing device. A current state of each image of the plurality of images is set to a loading state. While loading, the application: (a) determines that an image of the plurality of images is not to be used and (b) requests that loading of the not-used image be canceled. For each image in the plurality of images, the image loader: (a) determines whether the loading of the image is requested to be canceled, (b) in response to determining that the loading of the image is not requested to be canceled: (i) marks the current state of the image as loaded and (ii) displays the image, and (c) in response to determining that the loading of the image is requested to be canceled: (i) marks the current state of the image as no-image and (ii) recycles storage allocated for the image.

In another aspect, a method is provided. A computing device receives a request to display a plurality of images on the computing device. In response to the request, the computing device loads, in parallel, the plurality of images into storage of the computing device. The computing device determines whether an image of the plurality of images is to be used. In response to determining that the image is to be used, the computing device marks the image as loaded. In response to determining that the image is not to be used, the image loader marks the image as no-image. The computing device provides for display only images marked as loaded.

In a third aspect, an article of manufacture is provided. The article of manufacture includes a non-transitory computer-readable storage medium having instructions stored thereon that, when executed on by a processor, cause the processor to perform functions. The functions include: (a) receive a request to display a plurality of images, (b) load the plurality of images in parallel into storage associated with the processor, (c) determine whether an image is to be used, (d) in response to determining that the image is to be used, mark the image as loaded, (e) in response to determining that the image is not to be used, mark the image as no-image, and (f) providing for display only images marked as loaded.

BRIEF DESCRIPTION OF THE FIGURES

In the figures:

FIGS. 4A through 4H show an example mobile device user interface scenario with corresponding object views, in accordance with an example embodiment.

DETAILED DESCRIPTION

Overview

Figure 1A:
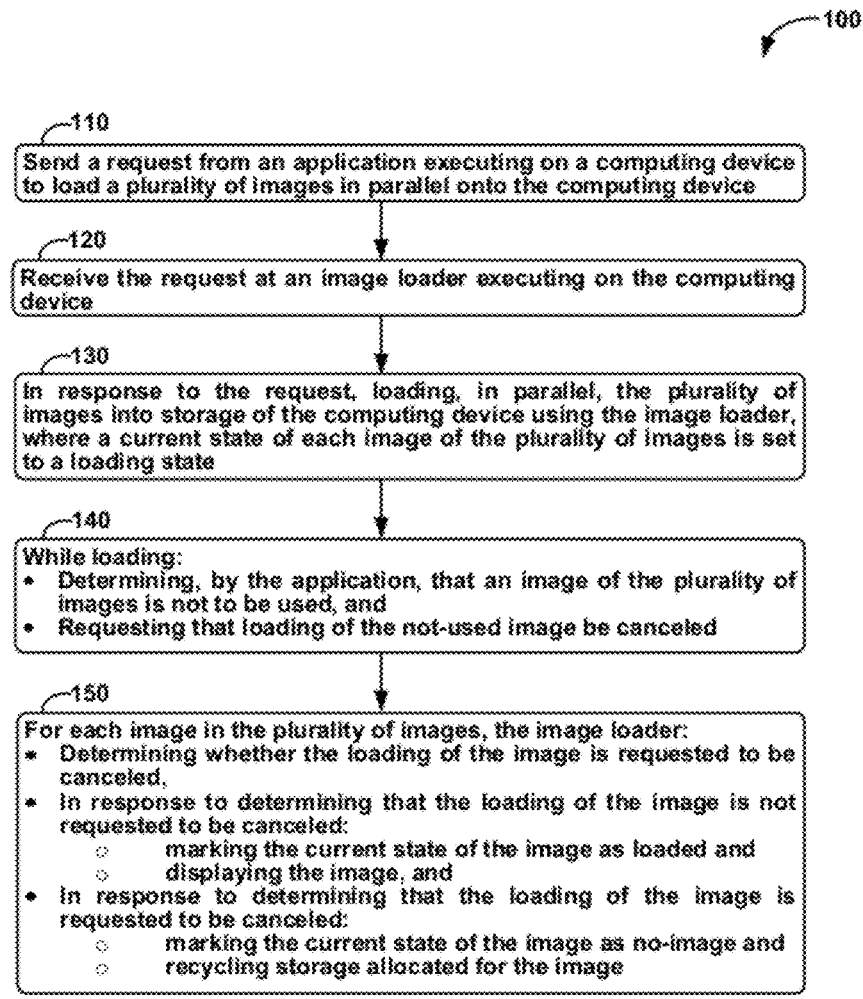
FIG. 1A is a flow chart of a method, in accordance with an example embodiment.

Modern computer operating systems, such as the Android operating system used to control smart devices, can provide services for one or more software applications. Android-based applications can include one or more "activities." Each activity enables the application to provide a user interface by providing objects and other resources to display images and text and/or receive user input.

In some cases, the application can require display of one or more images to provide the user interface and/or for other reasons; e.g., the application involves image retrieval, display, editing, and/or storage. To support such applications, an "image loader" can be used to load images into memory, manage the display of the images, and remove images from memory that are no longer being used. In some embodiments, the image loader can be partially or completely represented in software as an "ImageManager" object.

The image loader can have several features, including but not limited to:
 loading images in parallel without interfering with the user interface (a.k.a. in the background) and/or other processes executing in the background,
 load images coming from multiple sources, such as local in-memory storage (e.g., images stored as byte arrays), local file storage, trusted servers, and untrusted servers,
 scale displayed images to desired sizes, such as a requested number of rows and/or columns, as requested by the application, enable interruption of image loading when an image is no longer needed while accurately accounting for resource usage, and re-loading images evicted from memory, such as due to exhaustion of image memory, without user intervention.

The ImageManager object can work with an "ImageSource" or software object(s) to manage image storage. An image can be represented by an "ImageSpec" object, which includes a reference to an image data source, a loading state, and one or more size parameters; e.g. number of rows and/or columns in the image. The application can, perhaps via the ImageSource, request that the ImageManager object "bind" an ImageSpec object; that is, request display of the image represented by the ImageSpec object.

The ImageManager can then execute one of a pool of tasks. The executed task can load image data from the image data source into memory and decode the image data as needed to make the image data suitable for display. In some embodiments, a pre-determined maximum number of concurrent image-loading tasks can be used (e.g., four tasks) in the pool of tasks.

Different types of image data sources can be supported. Some images can be requested from a local and trusted server using a requesting Uniform Resource Locator (URL) to specify a desired image to be retrieved from the local server. In some cases, the requesting URL can include parameters that specify desired size(s) (e.g., width and height) for the image to be sent from the local server server. When the local server sends an image of the desired size, network bandwidth, memory, and time can be saved in comparison to sending the image of another size that requires resizing on arrival.

Other image data sources include external, untrusted servers. In such cases, a URL accessing a requested image on an external server can be embedded into a proxy URL. The proxy URL can request delivery of the requested image from the external server via a proxy server. As with the internal server, the proxy server can generate and send images of pre-determined size(s), where the size(s) can be specified respectively, via the URL or proxy URL Additionally, the proxy server can mask disclosure of an IP address of a device requesting the image to the external server. Instead, the proxy server can disclose only an IP address of the proxy server while communicating with the external server to transfer.

An image source can be local to a mobile device or other computing device executing the ImageManager software. Example local image sources include an image file in the mobile device's file system and an image stored in the mobile device's memory, such as in a byte array. A local loading mechanism can be used for local image sources. In some embodiments, the local loading mechanism can use a sampling parameter to provide an appropriately sized image to achieve some of the aforementioned memory and decode time advantages of server-side image scaling.

At all times, an image data source, and corresponding ImageSpec, has a current loading state. For example, the loading state can be specified as one of four possible states: LOADING, LOADED, NO_IMAGE, and ERROR. The initial loading state of an image, and the current state of the image while awaiting loading or in the process of being loaded, can be LOADING. Once the image is loaded into memory and is ready for display, the loading state can be set to LOADED. If the ImageManager determines or is informed that a LOADING image is no longer needed, then the state of the no-longer-needed image can be set to NO_IMAGE. If an error occurs during image loading, the loading state can be set to ERROR.

In operation, an image loading task can be provided with an ImageSpec object for loading. The task makes an initial check that the loading state of the ImageSpec is LOADING. If the ImageSpec's loading state is not LOADING, the task does not load the image. This handles the case where an image load is cancelled while the loading request is queued. In some implementations, the loading state is set to NO_IMAGE by the image loader while the image is being loaded by an image loading task, but the update to the loading state is not discovered by the image loading task until the image has completely loaded. Once the NO_IMAGE setting is discovered, the image loader can recycle the ImageSpec and remove the ImageSpec from a mapping of canonicalized image sources. In other implementations, in-progress image loading of the ImageSpec can be cancelled; e.g. by closing a socket for an underlying input stream of an external image, or by sending an event to an in-progress image loading thread that terminates the thread.

An ImageSpec object can be associated with one or more "lifecycle functions" that inform an application using the ImageManager of the loading state of an image. In some implementations, an "ImageConsumer" object, perhaps associated with an ImageSpec object, can store references to lifecycle functions called when a loading state of an image changes. For example, when a loading state of an ImageSpec is set to LOADING, a loading-state-related lifecycle function of the ImageConsumer object can be called. Similarly, a loaded-state-related lifecycle function can be called when the loading state of an ImageSpec is set to LOADED. Other lifecycle functions are possible as well. In particular embodiments, some or all of the lifecycle functions can be callback functions; e.g., functions executed in the memory context of the application, and as such, callback functions can act as if directly called by the application.

In embodiments where there is a one-to-one mapping between ImageConsumer objects and ImageSpec objects, the lifecycle functions of the ImageConsumer can inform the application about the single associated ImageSpec, and thus, the specific image associated with the ImageSpec. In these embodiments, the application can use the lifecycle functions to separately track the loading states of all image(s) that use the herein-described ImageSource/ImageManager framework of objects.

The framework can allow for the unloading of images that are not needed, but that are still bound. For example, images might still be bound by an application that is not active, and thus the images are not currently visible. In this case, if ImageManager and/or ImageSource need to free up image memory, the bound and not visible images can be unbound and the storage for those images freed. Upon freeing the image memory, the loading state(s) of the corresponding ImageSpec(s) can be set to NO_IMAGE. In this case, the framework can use unloaded-state-related and/or no-image-state-related lifecycle function(s) for the freed image(s) to inform the application. When the application came back into view, the application could request loading of the freed image(s) and/or the framework could automatically re-initiate the loading process for the freed image(s).

The techniques discussed herein can be applicable to loading objects other than images, such as video, audio, text, database, binary, and/or other type of object(s). For objects other than images, minor changes in loading states and terminology than used for images might be used. For example, for object(s) representing audio and/or video streams, a STREAMING loading state can be used to indicate that object memory has already loaded an initial part of the audio and/or video stream and is now being used to hold a portion of the audio and/or video stream. As another example, the term "object" or a similar term can replace the terms "image" and/or "photo"; e.g., the NO_IMAGE state and PhotoRef object could be respectively renamed to the NO OBJECT state and ObjectRef object.

Example Operations

Turning to the figures, FIG. 1A is a flow chart of method 100, in accordance with an example embodiment. Method 100 begins at block 110, where a request can be sent, to an image loader from an application executing on a computing device. The request can be a request to load a plurality of images in parallel onto the computing device.

At block 120, the request can be received at an image loader executing on the computing device.

At block 130, in response to the request, the image loader can load, in parallel, the plurality of images into storage of the computing device. A current state of each image of the plurality of images can be set to a loading state.

At block 140, while the plurality of images is loading: (a) the application can determine that an image of the plurality of images is not to be used, and (b) cancellation of loading of the not-usage image can be requested.

At block 150, for each image in the plurality of images, the image loader can: (a) determine whether the loading of the image is requested to be canceled, (b) in response to determining that the loading of the image is not requested to be canceled, the image loader can (i) mark the current state of the image as loaded and (ii) display the image, and (c) in response to determining that the loading of the image is requested to be canceled, the image loader can (i) mark the current state of the image as no-image and (ii) recycle storage allocated for the image.

In some embodiments, a second application executing on the computing device can send a second request to load a second plurality of images in parallel onto the computing device. The second request can differ from the request, and the second application can differ from the application. The image loader can receive the second request before the image loader has loaded the plurality of images. In response to the second request, the image loader can load both the plurality of images and the second plurality of images in parallel into respective storage of the computing device.

Figure 1B:
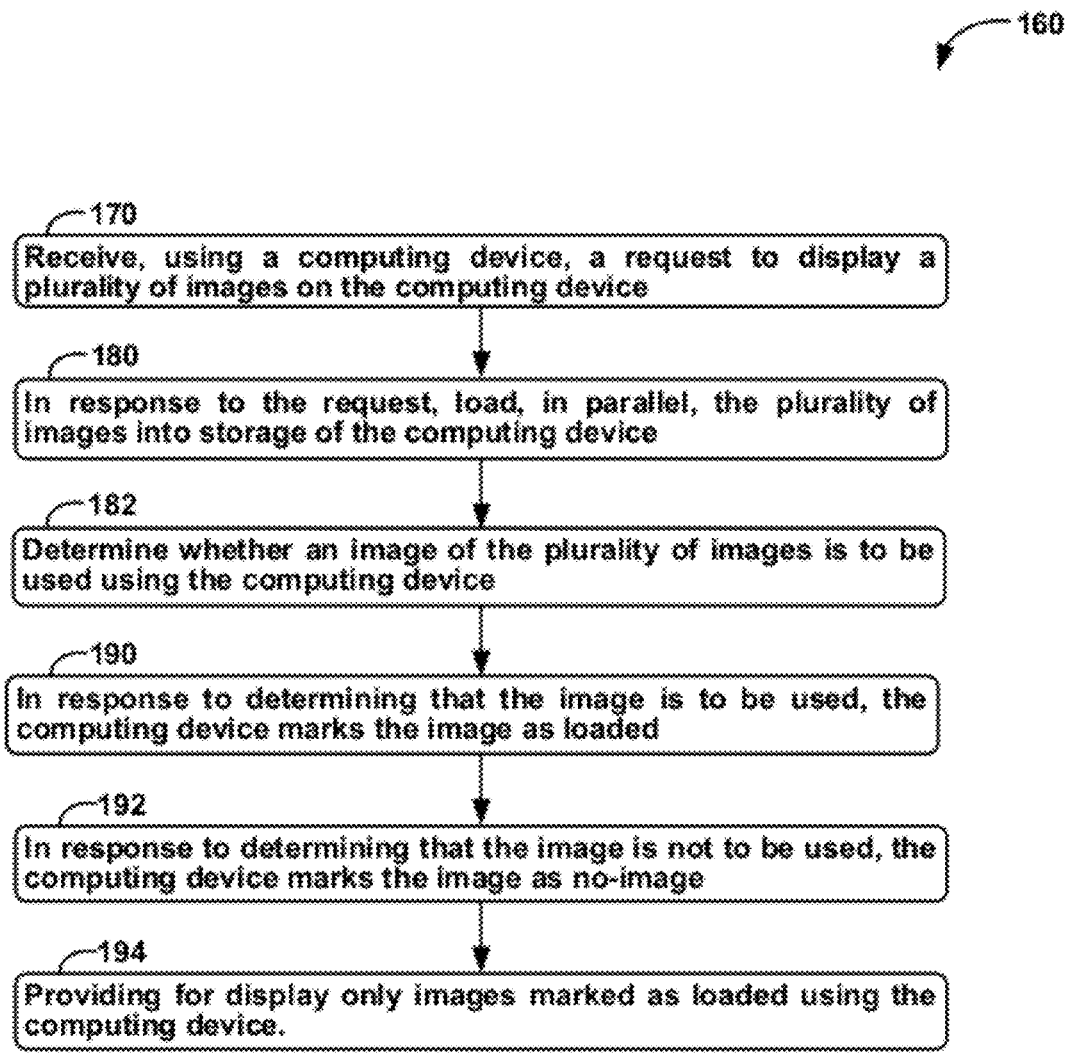
FIG. 1B is a flow chart of another method, in accordance with an example embodiment.

FIG. 1B is a flow chart of method 160, in accordance with an example embodiment. Method 160 begins at block 170, where a request can be received at a computing device. The request can be a request to display a plurality of images in parallel on the computing device.

In some embodiments, the plurality of images can include an image stored as an array, such as a byte array, on the computing device. In other embodiments, the plurality of images can include an image stored as a file on the computing device.

In still other embodiments, the plurality of images can include an image accessible via a uniform resource locator (URL). In some of the still other embodiments, the image accessible via the URL includes an image accessible via an imaging proxy server. In other of the still other embodiments, the URL includes a size parameter for the image accessible via the URL. In particular of the still other embodiments, the computing device can request delivery of the image of a pre-determined size by specifying the size parameter for the image. In response, the computing device can receive the requested image having the pre-determined size.

At block 180, in response to the request, the computing device can load, in parallel, the plurality of images into storage of the computing device. At block 182, the computing device can determine whether an image of the plurality of images is to be used. At block 190, in response to determining that the loading of the image is not requested to be canceled, the computing device can mark the image as loaded.

At block 192, in response to determining that the loading of the image is requested to be canceled, the computing device can mark the image as no-image. In some embodiments, in response to marking the image as no-image, the computing device can recycle storage allocated for the marked image.

At block 194, the computing device can provide for display only images marked as loaded. In particular of some embodiments, the computing device can, after recycling storage allocated for the marked image, receive a second request to display the marked image on the computing device. In response to the second request, the computing device can: (i) generate an image specification for the marked image, where the image specification includes a state of the marked image, (ii) initiate loading of the marked image into the storage of the computing device, (iii) set the state of the marked image as loading, (iv) determine that the marked image is to be used, and (v) in response to determining that the image is to be used and that loading of the marked image is complete, setting the state of the marked image as loaded and providing the marked image for display.

In other embodiments, the request can include a callback software function for the image. In these embodiments, marking the image as no-image can include deleting the callback software function for the image. In still other embodiments, in response to determining that the image is not to be used by the application, an in-progress loading of the image can be canceled.

Example User Interface Scenario

Figure 2A:
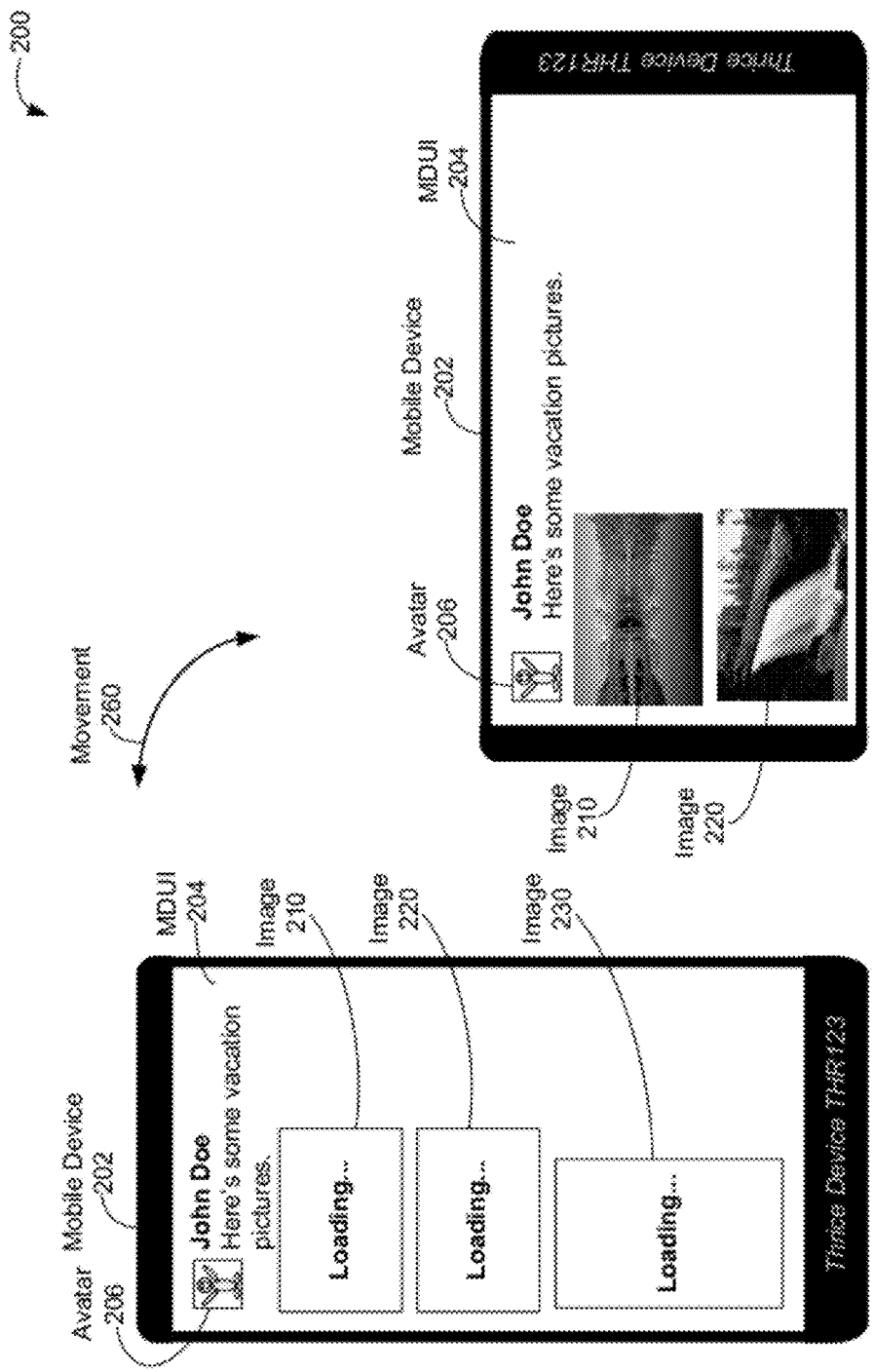
FIGS. 2A and 2B show an example mobile device user interface scenario, in accordance with an example embodiment.
Figure 2B:
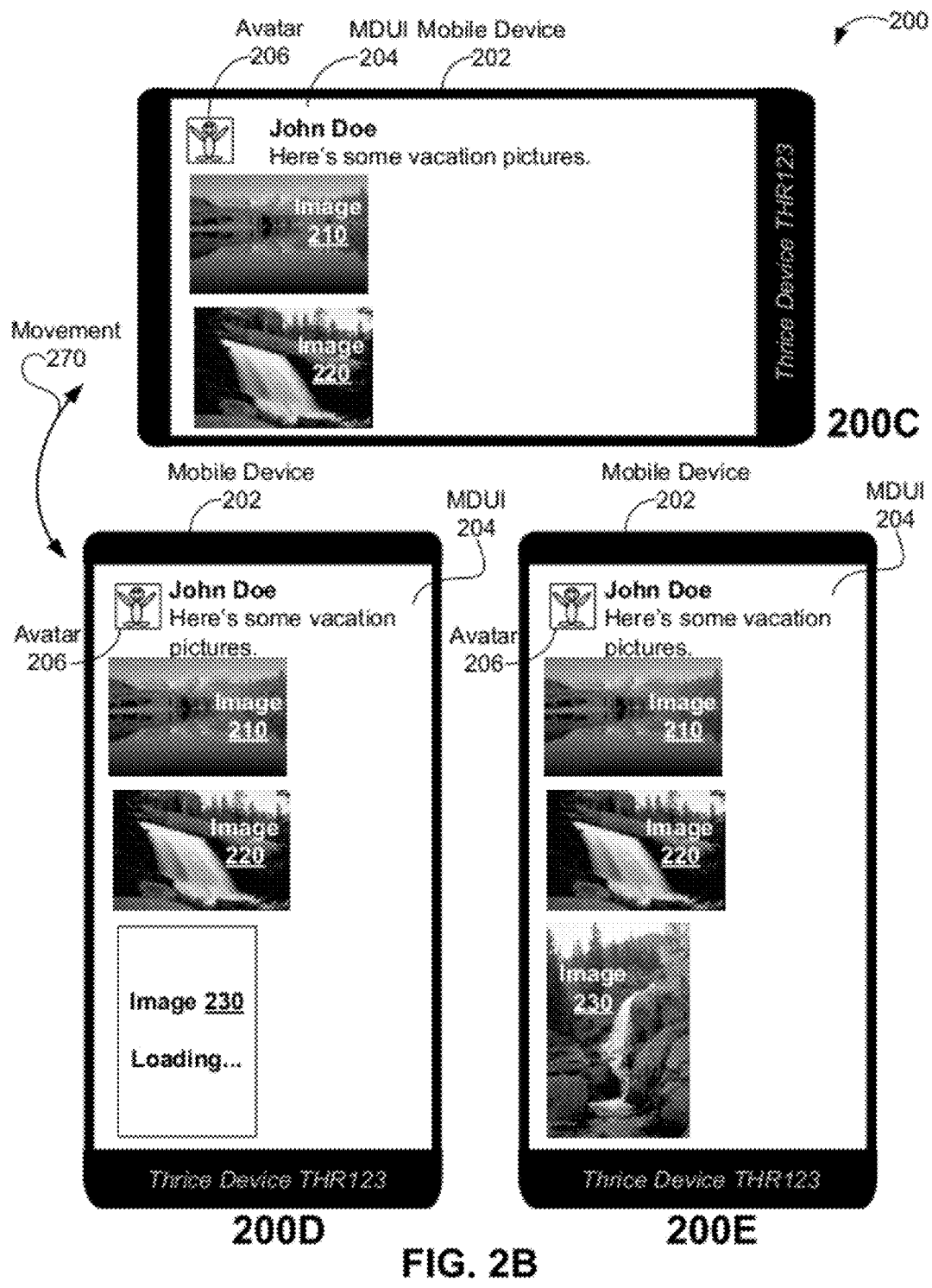

FIGS. 2A and 2B show mobile device user interface scenario 200 in accordance with an example embodiment. At 200A of scenario 200, mobile device 202 is shown in a "portrait" orientation, or with mobile device 202 shown with a height of mobile device 202 greater than a width of mobile device 202. In scenario 200 at 200A, mobile device user interface (MDUI) 204 is being utilized by an application configured to display images to load three images 210, 220, 230 and display already-loaded avatar 206, along with text from "John Doe" indicating that the images are "vacation pictures."

At 200B of scenario 200, mobile device 202 is moved by movement 260. Movement 260, which is a rotation gesture, changes the orientation of mobile device 202 from portrait to "landscape", or shown with the width of mobile device 202 wider than the height. As such, image 230 is not visible when mobile device 202 has a landscape orientation. Also at 200B, images 210 and 220 have completed loading and are shown displayed by mobile device 202. FIG. 2A also shows that avatar 206 remains displayed at 200B.

Turning to FIG. 2B, at 200C of scenario 200, movement 260 has concluded. Mobile device 202 remains in landscape orientation with avatar 206, images 210 and 220 being displayed.

At 200D of scenario 200, FIG. 2B shows that mobile device 202 is moved by movement 270, which is a rotation gesture that changes the orientation of mobile device 202 from landscape back to portrait. As mobile device 202 has a portrait orientation, image 230 is visible again. At 200D, FIG. 2B shows image 230 being loaded by mobile device user interface 204 and shows avatar 206, images 210 and 220 continuing to be displayed.

At 200E of scenario 200, movement 270 has concluded. Also, image 230 has completed loading and is being displayed on mobile device 202, while avatar 206, image 210, and image 220 continue to be displayed.

Example Framework for Loading and Managing Images

Figure 3:
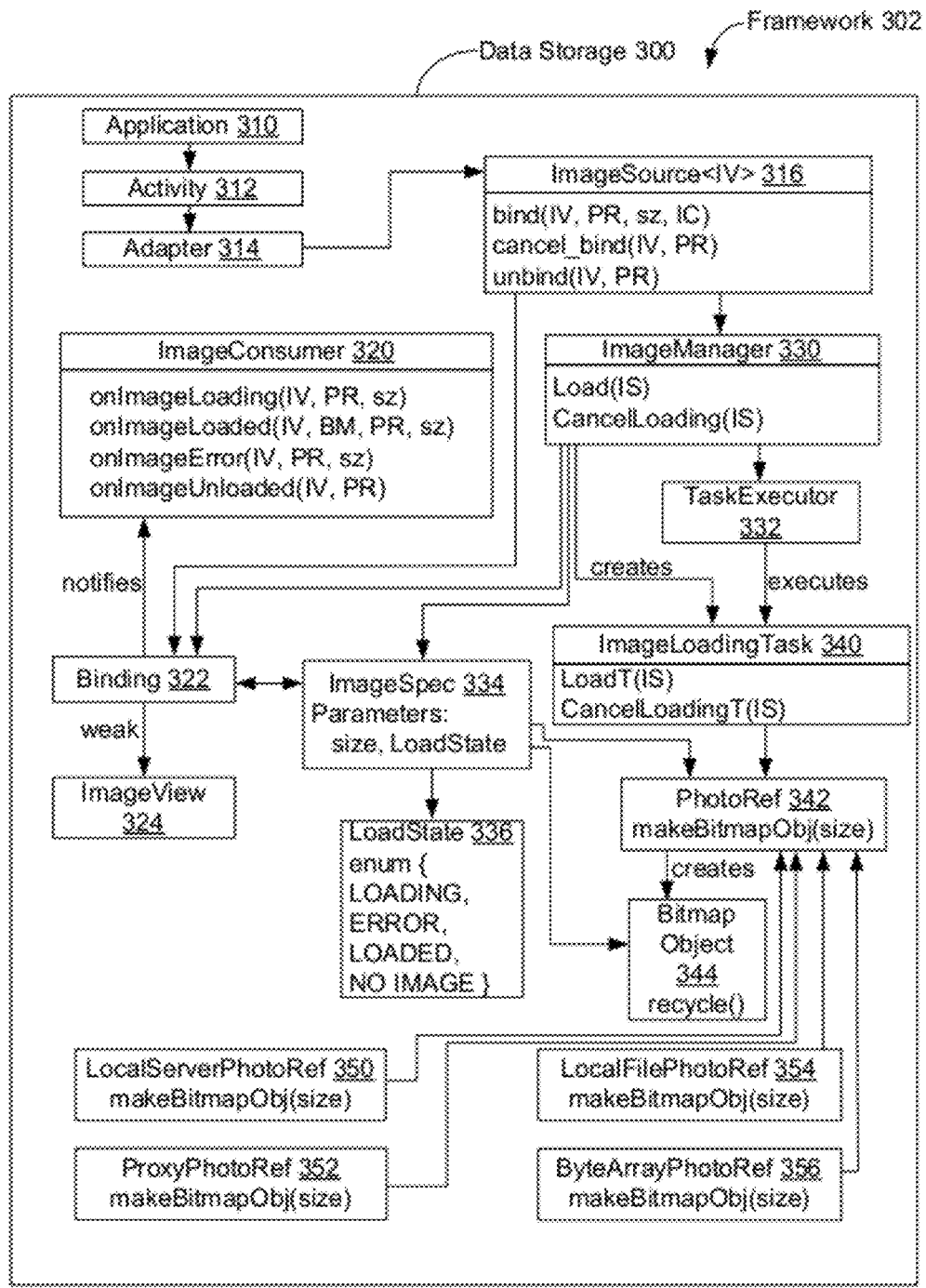
FIG. 3 shows data storage with a software framework for loading and managing images, in accordance with an example embodiment.

FIG. 3 shows example data storage 300 with software framework 320 for loading and managing images. FIG. 3 shows data storage 300 including application 310, activity 312, adapter 314, ImageSource 316, ImageConsumer (IC) 320, binding 322, ImageView (IV) 324, ImageManager 330, TaskExecutor 332, ImageSpec (IS) 334, LoadState 336, ImageLoading (IL) Task 340, PhotoRef (PR) 342, Bitmap Object (BM) 344, LocalServerPhotoRef 350, ProxyPhotoRef 352, LocalFilePhotoRef 354, and ByteArrayPhotoRef 356. As described herein, framework 302 does not include application 310, activity 312, and adaptor 314, but rather only includes objects 316-356 shown in FIG. 3, unless specifically stated otherwise.

Application 310 is an instance of a software object representing a base class for a software program or "application." Activity 312 is an instance of a software object representing a single focused task to be performed. In some cases, an activity can be presented to a user via a user interface, such as a window.

In FIG. 3, arrows indicate references from a referencing item to referred-to item. For example, the arrow from application 310 to activity 312 indicates that application 310, which is the referencing item, references activity 312, which is the referred-to item. Unless specifically stated, each reference shown in FIG. 3 can refer to one or more items; continuing this example, application 310 can refer to one or more activities 312.

Adapter 314 is a software object that provides a referencing item access to data within a referred-to item. For example, activity 312 can use adapter 314 to access data within ImageSource 316.

ImageSource 316, ImageConsumer 320, ImageManager 330, TaskExecutor 332, ImageSpec 334, ImageLoadingTask 340, PhotoRef 342, and Bitmap Object 344 are instances of software objects that together provide a utility for loading and managing images. As shown in FIG. 3, the managed images are stored as bitmap objects, such as Bitmap Object 344. A bitmap object in turn can contain one or more reference(s) or pointer(s) to one or more blocks of memory that store image data.

ImageSource 316 can be used to manage storage for images. FIG. 3 shows that ImageSource 316 has at least three "entry points" or functions or methods that can be externally called. The bind( ) entry point takes four parameters—an ImageView object IV, a PhotoRef object PR, a size value sz, and an ImageConsumer object IC—to load image data from PR, which is of type IV, of size sz into image memory and display the corresponding image. The cancel_bind( ) entry point cancels in-progress or just-completed loading and/or display of a PhotoRef object PR of type IV. The unbind( ) entry point requests removal of a PhotoRef object PR of type IV from image memory. In some embodiments, cancel_bind( ) also requests removal of PR from image memory.

ImageSource 316 can be an instance of an object representing an image based on a specified type. For the example shown in FIG. 3, the specified type is IVT, which is an abbreviation for ImageViewType. Other types are possible as well, and ImageView 324 is of type IVT.

ImageConsumer 320 provides an interface to lifecycle functions for an image corresponding to a pre-determined PhotoRef object PR of type IV. The onImageLoading( ) lifecycle function informs an application that PR in the process of being loaded into image memory with size sz. The onImageLoaded( ) lifecycle function informs an application that PR has been loaded into image memory accessible by Bitmap Object BM and has size sz. If an error occurs during loading of PR or if PR is unloaded (e.g., due to lack of image memory), framework 302 can respectively call the onImageError( ) lifecycle function or the onImageUnloaded( ) lifecycle function to so inform application 310. In some embodiments, one or more of the lifecycle functions of ImageConsumer 320 can be callbacks to application 310.

Binding 328 permits decoupling of ImageSource 316, Image Consumer 320, ImageView 324, ImageManager 330, and ImageSpec 334. This decoupling permits use of an image in an ImageSpec 334 by an ImageSource 316 and ImageView 324 to be bound/viewed, by an ImageManager 330 to potentially be released after viewing, and perhaps back to ImageSource 316 for re-binding.

ImageManager 330 can coordinate loading and unloading of images. FIG. 3 shows ImageManager 330 with two entry points: Load( ) and CancelLoading( ) Both entry points take one parameter—an ImageSpec object 334 IS. The Load( ) entry point can be used to request loading of an image represented by IS into image memory and subsequently display the image loaded into image memory. The CancelLoading( ) entry point can be used to cancel in-progress and/or just completed loading and/or display of the image represented by IS.

ImageManager 330 can use TaskExecutor 332 to execute multiple tasks to load and unload images in parallel. In the example shown in FIG. 3, these tasks can be ImageLoadingTasks 340. ImageManager 330 can invoke TaskExecutor 332 to find and execute an inactive ImageLoadingTask out of a pool of NT ImageLoadingTasks, with NT>1; e.g., NT=4. ImageLoadingTask 340 has two entry points, which correspond to and perform the work for the entry points of ImageManager 330. A LoadT( ) entry point of ImageLoadingTask 340 corresponds to the Load( ) entry point of ImageManager 330, and a CancelLoadingT( ) entry point of ImageLoadingTask 340 corresponds to the CancelLoading( ) entry point of ImageManager 330.

ImageSpec 334 can be an object that "canonically" represents a loaded image at a certain size. In this case, the "canonical" object representation is used to share the same rendered image everywhere it is viewed. By using canonical object representations, identical copies of the image will not be loaded, even if the same image rendering is viewed in two or more different places.

FIG. 3 shows ImageSpec 334 can have least two parameters: a size and a LoadState. The values of LoadState are specified by the enumeration LoadState 336 to include states of LOADING, ERROR, LOADED, and NO_IMAGE. In embodiments not shown in FIG. 3, ImageSpec 334 can include image-specific parameters, names, image references such as URLs, and other parameters.

FIG. 3 also shows ImageSpec 334 can include a reference to Bitmap Object 344. Bitmap Object 344 can include reference(s) to image memory, where the image memory is configured to store one or more images. FIG. 3 shows that Bitmap Object 344 includes one entry point—recycle( ) which can be used to free up image memory allocated to the image(s) referred to by Bitmap Object 344. In some embodiments, Bitmap Object 344 can include a block of image memory, perhaps for storing small images such as avatar 206 or for caching, instead of or along with reference(s) to image memory.

The image data can be provided from a number of sources, such as local servers, proxy-accessible or remote servers, local files, and image data stored in a "byte array" within data storage 300. The PhotoRef object 342 can provide a general interface to the image data. As shown in FIG. 3, PhotoRef 342 has one entry point, makeBitmapObj( ) which takes a size parameter. The makeBitmapObj( ) entry point can create a Bitmap Object, such as Bitmap Object 344, allocate image memory suitable to store an image of the size indicated by the size parameter, and link a reference (not shown in FIG. 3) within Bitmap Object 344 to the allocated image memory. In some embodiments, makeBitmapObj( ) can additionally decode image data, as needed, for display on the computing device via activity 312, and/or store the decoded image data in the allocated image memory in a suitable fashion for later display. In other embodiments, the makeBitmapObj( ) entry point can return a value indicating success or failure of loading image data into the image memory. For example, the makeBitmapObj( ) entry can return a reference to Bitmap Object 344 upon successful loading of image data into image memory, and can return a NULL reference upon a failure to load image data into image memory The PhotoRef 342 object can be implemented in Java or other suitable language as a class of objects. Then, subclasses that specialize the general PhotoRef 342 class can specify how to provide access to each of a number of sources of image data. For examples, a sub-class for LocalServerPhotoRef 350 can specify how to access image data stored on a local and trusted server, a sub-class for ProxyPhotoRef 352 can specify how to access image data on an external, and possibly untrusted server via a proxy, a sub-class for LocalFilePhotoRef 354 can specify how to access image data stored on a local file, and a sub-class for ByteArrayPhotoRef 356 can specify how to access image data stored in a memory of a computing device executing framework 302.

In embodiments where objects other than images are managed by the ImageSource and ImageManager, sub-classes that specialize the general PhotoRef 342 class can specify how to provide access to objects other than images, such as video, audio, text, database, binary, and/or other type of object(s).

LocalServerPhotoRef 350 provides an interface for accessing image data stored on a local and trusted server. In some embodiments, a uniform resource locator (URL) can be used to access image data on the local and trusted server. The makeBitmapObj( ) entry point for LocalServerPhotoRef 350 can create a Bitmap Object, allocate image memory suitable to store an image of the size indicated by the size parameter, link a reference in the Bitmap Object to the allocated image memory, retrieve image data via the URL, decode the image data as needed, and store the (decoded) image data in the allocated image memory.

ProxyPhotoRef 352 provides an interface for accessing image data stored on a server that is accessed via a proxy. A proxy server can request delivery of the requested image specified by a proxy URL, which can include an embedded URL specifying the location of the image data on the server being accessed via proxy. Both the local and trusted server and the proxy server can generate and send images of pre-determined size(s), where the size(s) (e.g., width and height) can be specified, respectively, via the URL or proxy URL. The proxy server can hide an internal network address, such as an Internet Protocol (IP) address or Media-Access Control (MAC) address, from the server being accessed via proxy, which provides some security to the device requesting the image. Rather, when using ProxyPhotoRef 352 with a proxy URL, the server being accessed only receives addressing information from the proxy server, not the requesting device. The makeBitmapObj( ) entry point for ProxyPhotoRef 352 can create a Bitmap Object, allocate image memory suitable to store an image of the size indicated by the size parameter, link a reference in the Bitmap Object to the allocated image memory, retrieve image data via the proxy URL, decode the image data as needed, and store the (decoded) image data in the allocated image memory.

LocalFilePhotoRef 354 is used to provide an interface for accessing image data stored in a local file on the computing device executing application 310 and framework 302. The makeBitmapObj( ) entry point for LocalFilePhotoRef 354 can create a Bitmap Object, allocate image memory suitable to store an image of the size indicated by the size parameter, link a reference in the Bitmap Object to the allocated image memory, retrieve image data from the local file, decode the image data as needed, and store the (decoded) image data in the allocated image memory.

ByteArrayPhotoRef 356 can provide an interface for accessing image data stored in a "byte array", or array of image values, in a memory, such as data storage 300, of the computing device executing application 310 and framework 302. The term "data array" does not necessarily imply a data structure used to store the image data. Rather, any suitable data structure, such as but not limited to, a list, linked list, queue, priority queue, stack, matrix, heap, object, and layout can be used to implement the herein-described data array. The makeBitmapObj( ) entry point for ByteArrayPhotoRef 356 can create a Bitmap Object, allocate image memory suitable to store an image of the size indicated by the size parameter, link a reference in the Bitmap Object to the allocated image memory, retrieve image data from the byte array, decode the image data as needed, and store the (decoded) image data in the allocated image memory.

FIGS. 4A through 4H show mobile device user interface scenario 400 with corresponding object views, in accordance with an example embodiment. Scenario 400 is closely related to scenario 200 of FIG. 2.

Figure 4A:
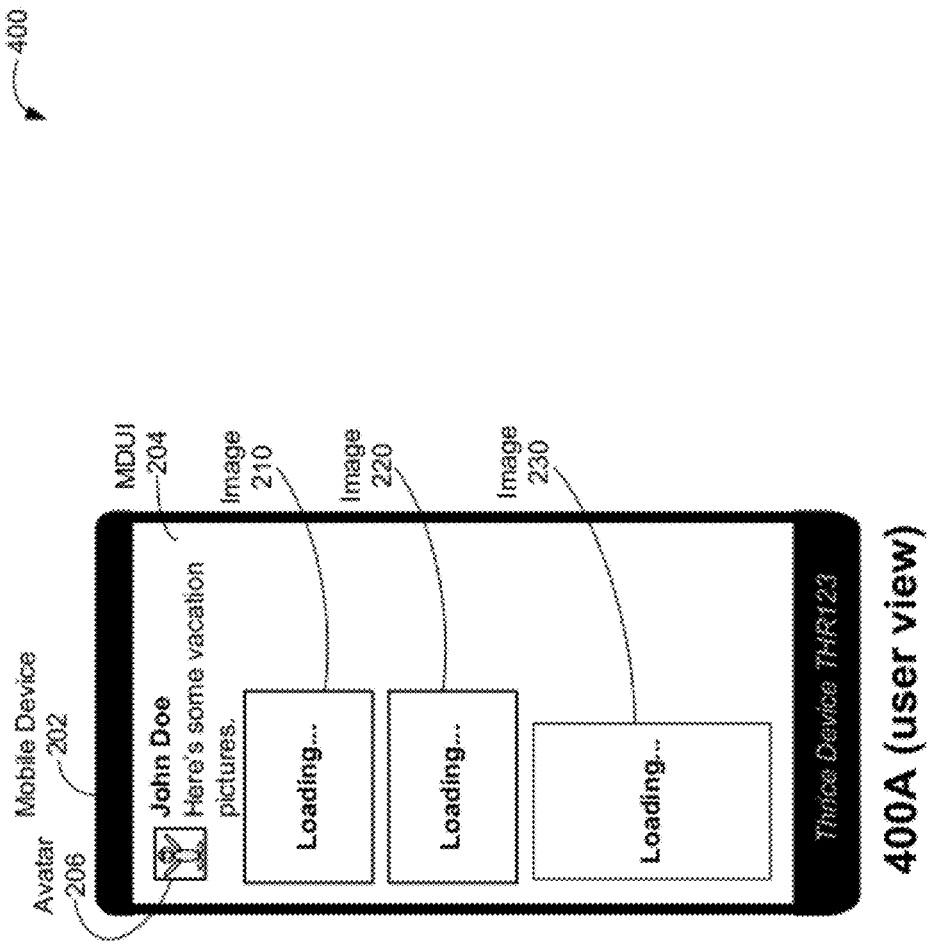

FIG. 4A shows that, at 400A of scenario 400, mobile device 202 is in a portrait orientation and mobile device user interface 204 is being utilized by an application configured to display images. FIG. 4A shows that the application has requested loading three images 210, 220, 230 and is displaying already-loaded avatar 206, along with text from "John Doe" indicating that the images are "vacation pictures."

Figure 4B:
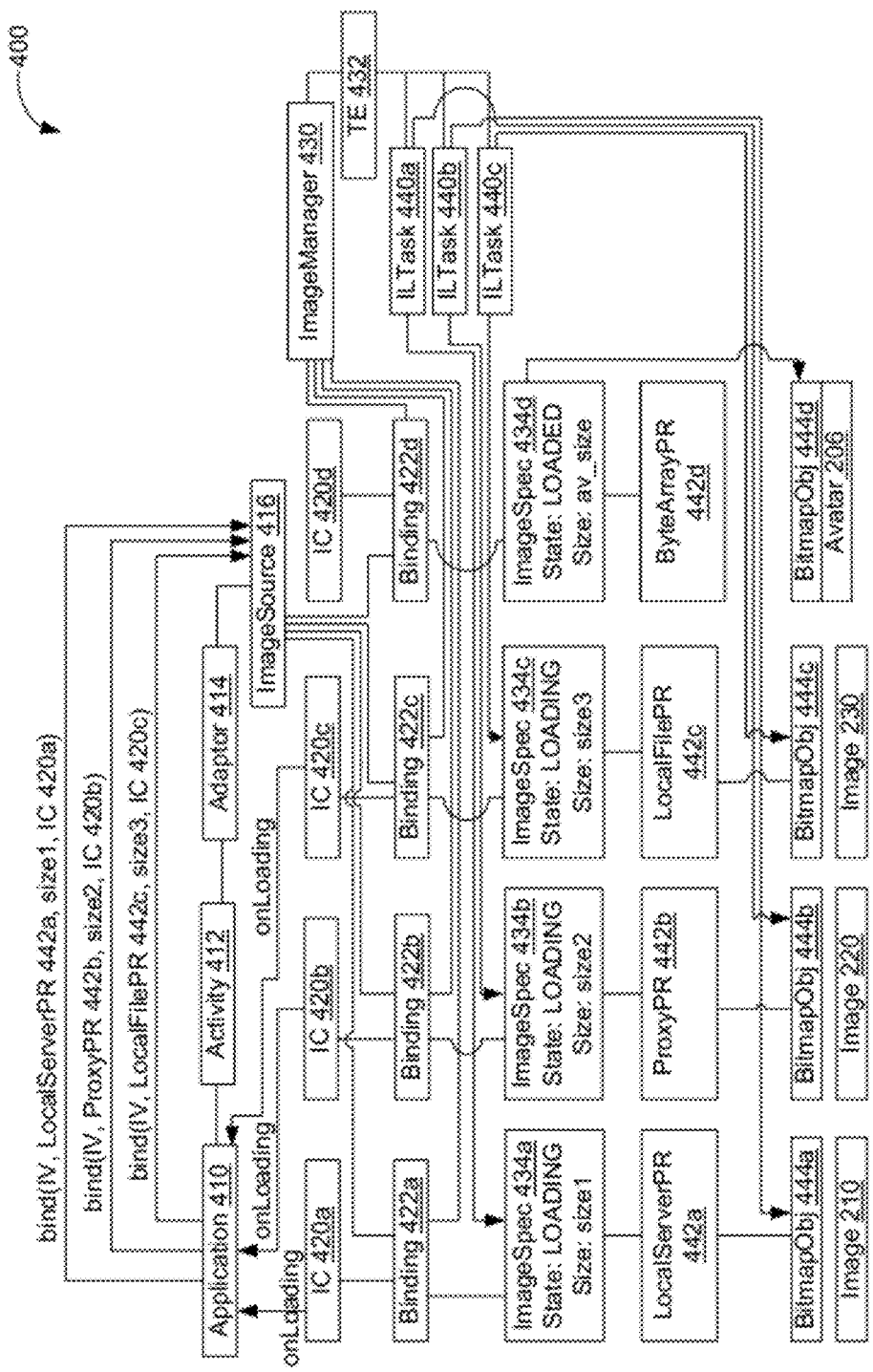

FIG. 4B shows an example object view at 400A of scenario 400 utilizing framework 302 that corresponds to the end of 400A of scenario 400. At 400A, application 400 refers to activity 412, activity 412 refers to adapter 414, and adapter 414 refers to ImageSource 420.

To load images 210, 220, and 230, application 410 can call the bind( ) entry point of ImageSource 420 three times: one for each of images 210, 220, and 230. At the top of FIG. 4B, a first call to bind( ) is shown as "bind(IV, LocalServerPR 442a, size1, IC 420a)", which indicates that bind is being called for an ImageSource of type IV. The image being bound in this bind( ) call is referred to specifically by LocalServerPR 442a, has size size1, and is associated with lifecycle functions stored in IC (ImageConsumer) 420a. In scenario 400, PhotoRef LocalServerPR 442a is a PhotoRef configured to access a local and trusted server to obtain image 210.

Similarly, a second bind( ) call "bind(IV, ProxyPR 442b, size2, IC 420b)" shown at the top of FIG. 4B indicates that bind is being called for an ImageSource of type IV for an image referred to by ProxyPR 442b, has size size2, and is associated with lifecycle functions stored in IC 420b. In scenario 400, PhotoRef ProxyPR 442a is a PhotoRef configured to use a proxy to access an untrusted server to obtain image 220.

Additionally, a third bind( ) call "bind(IV, LocalFile PR 442c, size3, IC 420c)" shown at the top of FIG. 4B indicates that bind is being called for an ImageSource of type IV for an image referred to by LocalFile PR 442*c*, has size size3, and is associated with lifecycle functions stored in IC 420*c*. In scenario 400, LocalFile PR 442*c* is a PhotoRef configured to access a locally-stored file to obtain image 230.

In response to the first bind call to load an image represented by LocalServerPR 442*a*, ImageSource 416 can request storage for a new ImageSpec to be ImageSpec 434*a* and for a new Binding to be Binding 422*a*. ImageSource 416 can "point at" or set a reference to a Binding to refer to Binding 422*a*. ImageSource 416 and/or ImageSpec 434*a* can initialize the new ImageSpec as ImageSpec 434*a* by: pointing a reference to a Binding (in ImageSpec 434*a*) at Binding 422*a*, pointing a reference to a PhotoRef at LocalServerPR 442*a*, setting the LoadState to LOADING, setting a Bitmap Object reference to NULL (e.g., referring to no object), and setting a size parameter to size1. In some embodiments, not all of the herein-described references regarding ImageSources, ImageManagers, Bindings, PhotoRefs, ImageConsumers, ImageSpecs, Bitmap Objects, ImageLoadingTasks, Task Executors, other objects, and/or images may be set and/or used.

ImageSource 416 and/or Binding 422*a* can initialize the new Binding as Binding 422*a* by: pointing a reference to an ImageSource at ImageSource 416, pointing a reference to an ImageSpec at ImageSpec 434*a*, pointing a reference to an ImageConsumer at ImageConsumer 420*a*, and pointing a reference to an ImageManager to ImageManager 430. Also, ImageSource 416, Binding 422*a*, and/or ImageManager 430 can point a reference of ImageManager 430 referring to a Binding at Binding 422*a*.

After initializing ImageSpec 434*a* and Binding 422*a*, ImageSource 416 can call the Load entry point of ImageManager 430 with a parameter of ImageSpec 434*a*. In response, ImageManager 430 can request TaskExecutor 432 to allocate a free ImageLoadingTask, and then instruct the free ImageLoadingTask to carry out a loading operation for ImageSpec 434*a*. In scenario 400, TaskExecutor 432 allocates ImageLoadingTask (IL Task) 440*a* to carry out a loading operation for ImageSpec 434*a* via the LoadT entry point of ImageLoadingTask 440*a* with a parameter of ImageSpec434*a*.

In response to the LoadT entry point being called, ImageLoadingTask 440*a* can: (1) set the LoadState of ImageSpec 434*a* to LOADING, (2) call the onImageLoading( ) lifecycle function of ImageConsumer 420*a*, (3) retrieve the size parameter from ImageSpec 434*a* as size1 and (4) call the makeBitmapObj( ) entry point of LocalServerPR 442*a* with size1 as a parameter, via use of the PhotoRef reference of ImageSpec 434*a*. In scenario 400, the makeBitmapObj( ) entry of LocalServerPR 442*a* creates BitmapObj 444*a*, allocates image memory to store an image of at least size size1, decodes, and loads image data for image 210 into the allocated image memory, thereby preparing image 210 for display. ImageLoadingTask 440*a* can store a return value of either a reference to BitmapObj 444*a* when makeBitmapObj( ) is successful or a NULL pointer when makeBitmapObj( ) is not successful. In scenario 400, makeBitmapObj( ) for BitmapObj 444*a* is successful. Then, ImageLoadingTask 440*a* can set a reference to a BitmapObj in ImageSpec 434*a* equal to a reference to BitmapObj 444*a*.

In response to the onImageLoading( ) lifecycle function of ImageConsumer 420*a*, as part of the onImageLoading( ) lifecycle function of ImageConsumer 420*a*, or some other function, a "Loading..." placeholder image for image 210 can be displayed using mobile device user interface 204, perhaps by application 410 requesting display of the placeholder image, such as shown in FIG. 4A.

In scenarios not shown in the Figures, suppose that the makeBitmapObj( ) entry point of LocalServerPR 442*a* is not successful. Then, ImageLoadingTask 440*a* can invoke the onImageError( ) lifecycle function of ImageConsumer 420*a* with a parameters indicating that onImageError( ) is called for an image whose PhotoRef is LocalServerPR 442*a* and has size size1, and then terminate execution of entry point LoadT for LocalServerPR 442*a*. In particular embodiments, in response to the onImageError( ) lifecycle function or some other function, an error-placeholder image; e.g., "ERROR" or "UNAVAILABLE" for image 210 can be displayed using mobile device user interface 204, perhaps by application 410 requesting display of the error-placeholder image.

In response to the second bind call to load an image represented by ProxyPR 442*b*, ImageSource 416 and ImageManager 430 can perform substantially the same activities as performed for the first bind call. In particular, ImageSource 416 can request storage for ImageSpec 434*b* and for Binding 422*b*. ImageSource 416 can point a reference to a Binding at Binding 422*b*. ImageSource 416 and/or ImageSpec 434*b* can initialize ImageSpec 434*b* by: pointing a reference to a Binding (in ImageSpec 434*b*) at Binding 422*b*, pointing a reference to a PhotoRef at ProxyPR 442*b*, setting the LoadState to LOADING, setting a Bitmap Object reference to NULL, and setting a size parameter to size2.

ImageSource 416 and/or Binding 422*b* can initialize Binding 422*b* by: pointing a reference to an ImageSource at ImageSource 416, pointing a reference to an ImageSpec at ImageSpec 434*b*, pointing a reference to an ImageConsumer at ImageConsumer 420*b*, and pointing a reference to an ImageManager to ImageManager 430. Also, ImageSource 416, Binding 422*b*, and/or ImageManager 430 can point a reference of ImageManager 430 to a Binding at Binding 422*b*.

After initializing ImageSpec 434*b* and Binding 422*b*, ImageSource 416 can call the Load entry point of ImageManager 430 with a parameter of ImageSpec 434*b*. In response, ImageManager 430 can request TaskExecutor 432 to allocate a free ImageLoadingTask, and then instruct the free ImageLoadingTask to carry out a loading operation for ImageSpec 434*b*. In scenario 400, TaskExecutor 432 allocates ImageLoadingTask 440*b* to carry out a loading operation for ImageSpec 434*b* via the LoadT entry point of ImageLoadingTask 440*b* with a parameter of ImageSpec 434*b*.

In response to the LoadT entry point being called, ImageLoadingTask 440*b* can: (1) set the LoadState of ImageSpec 434*b* to LOADING, (2) call the onImageLoading( ) lifecycle function of ImageConsumer 420*b*, (3) retrieve the size parameter from ImageSpec 434*b* as size2, and (4) call the makeBitmapObj( ) entry of ProxyPR 442*b* with size2 as a parameter, via use of the PhotoRef reference of ImageSpec 434*b*. In scenario 400, the makeBitmapObj( ) entry of ProxyPR 442*b* creates BitmapObj 444*b*, allocates image memory to store an image of at least size size2, decodes, and loads image data for image 220 into the allocated image memory, thereby preparing image 220 for display. ImageLoadingTask 440*b* can store a return value of either a reference to BitmapObj 444*b* when makeBitmapObj ( ) is successful or a NULL pointer when makeBitmapObj( ) is not successful. In scenario 400, makeBitmapObj( ) for BitmapObj 444*b* is successful. Then, ImageLoadingTask 440*b* can set a reference to a BitmapObj in ImageSpec 434*b* equal to a reference to BitmapObj 444*b*.

In response to the onImageLoading( ) lifecycle function of ImageConsumer 420*b*, as part of the onImageLoading( ) lifecycle function of ImageConsumer 420*b*, or some other function, a "Loading..." placeholder image for image 220 can be displayed using mobile device user interface 204, perhaps by application 410 requesting display of the placeholder image, such as shown in FIG. 4A.

In response to the third bind call to load an image represented by LocalFilePR 442c, ImageSource 416 and ImageManager 430 can perform substantially the same activities as performed for the first and second bind call. In particular, ImageSource 416 can request storage for ImageSpec 434c and for Binding 422c. ImageSource 416 can point a reference to a Binding at Binding 422c. ImageSource 416 and/or ImageSpec 434c can initialize ImageSpec 434c by: pointing a reference to a Binding (in ImageSpec 434c) at Binding 422c, pointing a reference to a PhotoRef at LocalFilePR 442c, setting the LoadState to LOADING, setting a Bitmap Object reference to NULL, and setting a size parameter to size3.

ImageSource 416 and/or Binding 422c can initialize Binding 422c by: pointing a reference to an ImageSource at ImageSource 416, pointing a reference to an ImageSpec at ImageSpec 434c, pointing a reference to an ImageConsumer at ImageConsumer 420c, and pointing a reference to an ImageManager to ImageManager 430. Also, ImageSource 416, Binding 422c, and/or ImageManager 430 can point a reference of ImageManager 430 to a Binding at Binding 422c.

After initializing ImageSpec 434c and Binding 422c, ImageSource 416 can call the Load entry point of ImageManager 430 with a parameter of ImageSpec 434c. In response, ImageManager 430 can request TaskExecutor 432 to allocate a free ImageLoadingTask, and then instruct the free ImageLoadingTask to carry out a loading operation for ImageSpec 434c. In scenario 400, TaskExecutor 432 allocates ImageLoadingTask 440c to carry out a loading operation for ImageSpec 434c via the LoadT entry point of ImageLoadingTask 440c with a parameter of ImageSpec 434c.

In response to the LoadT entry point being called, ImageLoadingTask 440c can: (1) set the LoadState of ImageSpec 434c to LOADING, (2) call the onImageLoading( ) lifecycle function of ImageConsumer 420c, (3) retrieve the size parameter from ImageSpec 434c as size3, and (4) call the makeBitmapObj( ) entry of LocalFilePR 442c with size3 as a parameter, via use of the PhotoRef reference of ImageSpec 434c. In scenario 400, the makeBitmapObj( ) entry of LocalFilePR 442c creates BitmapObj 444c, allocates image memory to store an image of at least size size3, decodes, and loads image data for image 230 into the allocated image memory, thereby preparing image 230 for display. ImageLoadingTask 440c can store a return value of either a reference to BitmapObj 444c when makeBitmapObj( ) is successful or a NULL pointer when makeBitmapObj( ) is not successful. In scenario 400, makeBitmapObj( ) for BitmapObj 444c is successful. Then, ImageLoadingTask 440c can set a reference to a BitmapObj in ImageSpec 434c equal to a reference to BitmapObj 444c.

In response to the onImageLoading( ) lifecycle function of ImageConsumer 420c, as part of the onImageLoading( ) lifecycle function of ImageConsumer 420c, or some other function, a "Loading . . . " placeholder image for image 230 can be displayed using mobile device user interface 204, perhaps by application 410 requesting display of the placeholder image, such as shown in FIG. 4A.

Scenario 400 began with avatar 106 already loaded and displayed using mobile device user interface 204. FIG. 4B shows the objects and data items associated with the avatar, including ImageConsumer 420d, binding 422d, ImageSpec 434d shown in FIG. 4B with a loading state of LOADED and a size of av_size, and Bitmap 444d storing avatar 206. As avatar 206 has a loading state of LOADED, FIG. 4B shows ImageSpec 434d with a reference to BitmapObj 444d.

As shown in FIG. 4C, at 400B of scenario 400, movement 460 moves mobile device 202 to change orientation of mobile device 202 from portrait to landscape. As such, image 230 is not visible when mobile device 202 has a landscape orientation. Also at 400B, images 210 and 220 have completed loading and are shown displayed by mobile device 202. FIG. 4C also shows that avatar 206 remains displayed at 400B.

Figure 4D:
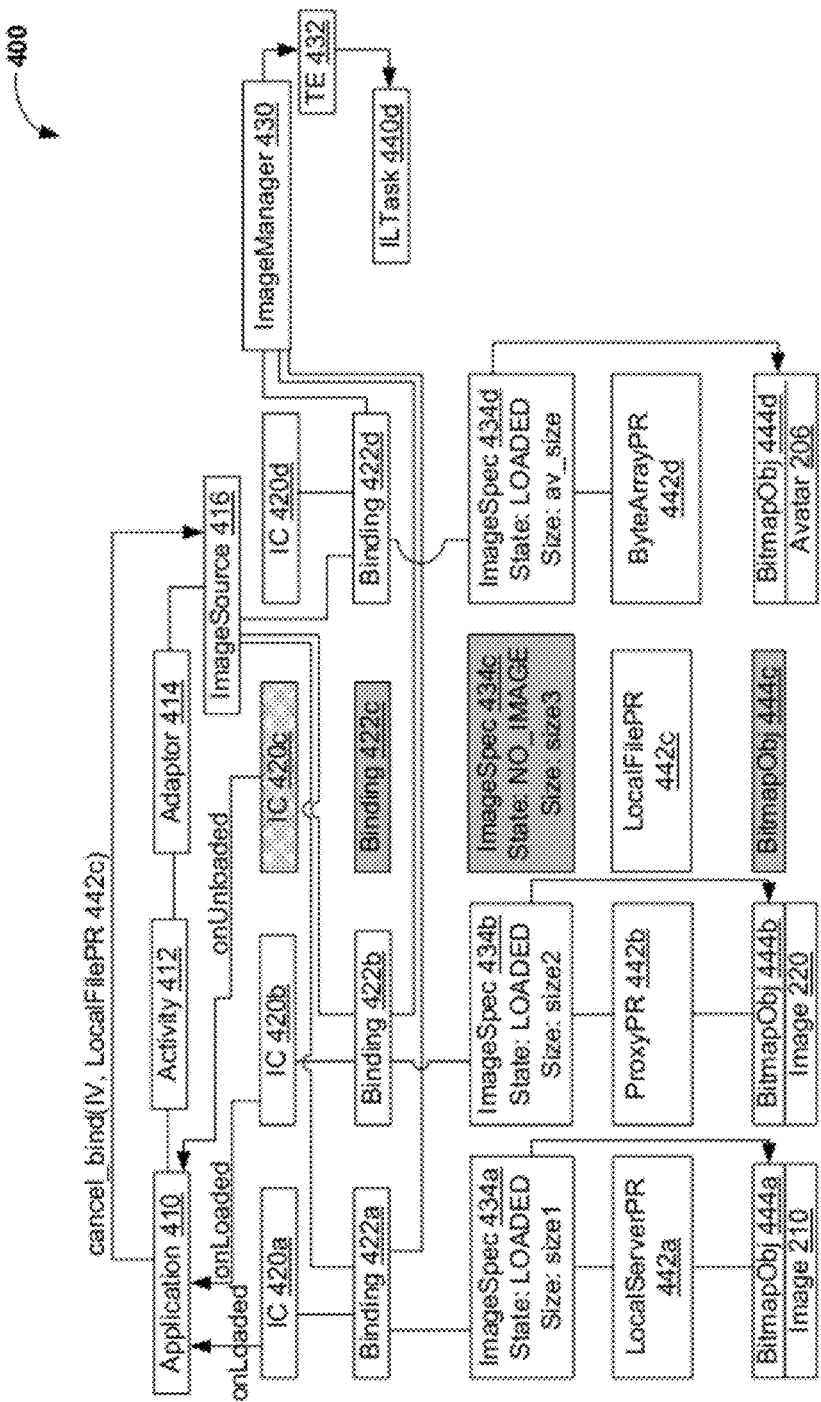

FIG. 4D shows an object view at the end of 400B of scenario 400. Also, in response to movement 460, application 410 has invoked the CancelLoading( ) entry point of ImageSource 416 to request that the loading and/or display of image 230, represented by LocalFilePR 442c, be stopped.

Regarding the loading of image 210, in scenario 400, the makeBitmapObj( ) entry point of BitmapObj 444a returned successfully to ImageLoadingTask 440a (not shown in FIG. 4D). FIG. 4D shows that BitmapObj 444a is associated with image memory storing image 210. Upon successful completion of the makeBitmapObj( ) entry point for BitmapObj 444a, ImageLoadingTask 440a can set the LoadState for ImageSpec 434a to LOADED and call the onImageLoaded( ) lifecycle function of ImageConsumer 420a. After calling onImageLoaded( ) ImageLoadingTask 440a can complete execution of entry point LoadT for LocalServerPR 442a.

In response to the onImageLoaded( ) lifecycle function call from ImageConsumer 420a for LocalServerPR 442a, application 410 can request mobile device user interface 204 to display image 210. In other embodiments, ImageLoadingTask 440a can request mobile device user interface 204 to display image 210 prior to completion of the LoadT entry point, and perhaps prior to calling onImageLoaded( ).

Regarding the loading of image 220, the makeBitmapObj( ) entry point of BitmapObj 444b returned successfully to ImageLoadingTask 440b (not shown in FIG. 4D). FIG. 4D shows that BitmapObj 444b is associated with image memory storing image 220. Upon successful completion of the makeBitmapObj( ) entry point for BitmapObj 444b, ImageLoadingTask 440b can set the LoadState for ImageSpec 434b to LOADED and call the onImageLoaded( ) lifecycle function of ImageConsumer 420b. After calling onImageLoaded( ) ImageLoadingTask 440a can complete execution of entry point LoadT for ProxyPR 442b.

In response to the onImageLoaded( ) lifecycle function call from ImageConsumer 420b for ProxyPR 442b, application 410 can request mobile device user interface 204 to display image 220. In other embodiments, ImageLoadingTask 440b can request mobile device user interface 204 to display image 220 prior to completion the LoadT entry point, and perhaps prior to calling onImageLoaded( ).

In response to movement 460, application 410 can be informed or otherwise determine that image 230 is not visible while mobile device 202 is in landscape orientation. In response to this determination that image 230 is not visible, application 410 can call the cancel_bind( ) entry point of ImageSource 416, as shown with the "cancel_bind(IV, LocalFilePR 442c)" call shown at the top of FIG. 4D, indicating that cancel_bind( ) is being called for an ImageSource of type IV for an image referred to by LocalFilePR 442c.

In response to the cancel_bind call, ImageSource 416 can call the CancelLoading( ) entry point of ImageManager 330 with a parameter of ImageSpec 434c. In response, ImageManager 430 can request TaskExecutor 432 to allocate a free ImageLoadingTask, and then instruct the free ImageLoadingTask to carry out a cancel loading operation for ImageSpec 434c. In scenario 400, TaskExecutor 432 allocates ImageLoadingTask 440d to carry out the cancel loading operation via the CancelLoadingT entry point of ImageLoadingTask 440*d* with a parameter of ImageSpec434*d*.

In response to the CancelLoadingT entry point being called, ImageLoadingTask 440*a* can: (1) set the LoadState of ImageSpec 434*c* to NO_IMAGE, (2) call the onImageUnloaded( ) lifecycle function of ImageConsumer 420*c*, (3) determine whether the BitmapObj reference of ImageSpec 434*c* points to a BitmapObj, (4) upon determining that, in scenario 400, the BitmapObj reference of ImageSpec 434*c* points to BitmapObj 444*c*, invoke the recycle( ) entry point of BitmapObj 444*c*, (5) clear the BitmapObj reference of ImageSpec 434*c* by setting this reference to NULL, and (6) terminate execution. BitmapObj 444*c* is shown in grey to indicate that its storage is subject to reclamation and/or has been reclaimed, as there are no references to the object.

Upon termination of the CancelLoadingT entry point, ImageLoadingTask 440*d* can terminate execution. In response, Image Manager 430 can complete execution of the CancelLoading entry point. Upon determining that the CancelLoading entry point has completed execution, ImageSource 416 can locate ImageSpec 434*c* as a canonical image source related to LocalFile PR 442*c* and thus related image 230. As ImageSpec 434*c* is related to an unloaded image, ImageSpec 434*c* can be reclaimed to prevent incorrect reuse. ImageSource 416 can retrieve, perhaps from ImageSpec 434*c*, a reference to Binding 422*c*.

ImageSource 416 can then clear all the references in Binding 422*c* and ImageSpec 434*c* to other objects set up as discussed above in the context of FIG. 4B; e.g., set references to ImageSource 416, Image Manager 430, ImageConsumer 420, etc. all to NULL. FIG. 4D shows Binding 422*c* and ImageSpec 434*c* in grey to show that both objects are subject to reclamation. In some embodiments, ImageSource 416 can request reclamation of Binding 422*c* and/or ImageSpec 434*c*. Then, the cancel_bind( ) entry point of ImageSource 416 can terminate. In some embodiments, the cancel_bind( ) entry point of ImageSource 416 can invoke the onImageUnloaded( ) lifecycle function instead of being invoked by the CancelLoadingT( ) entry point of ImageLoadingTask 440*d* as mentioned above.

Figure 4E:
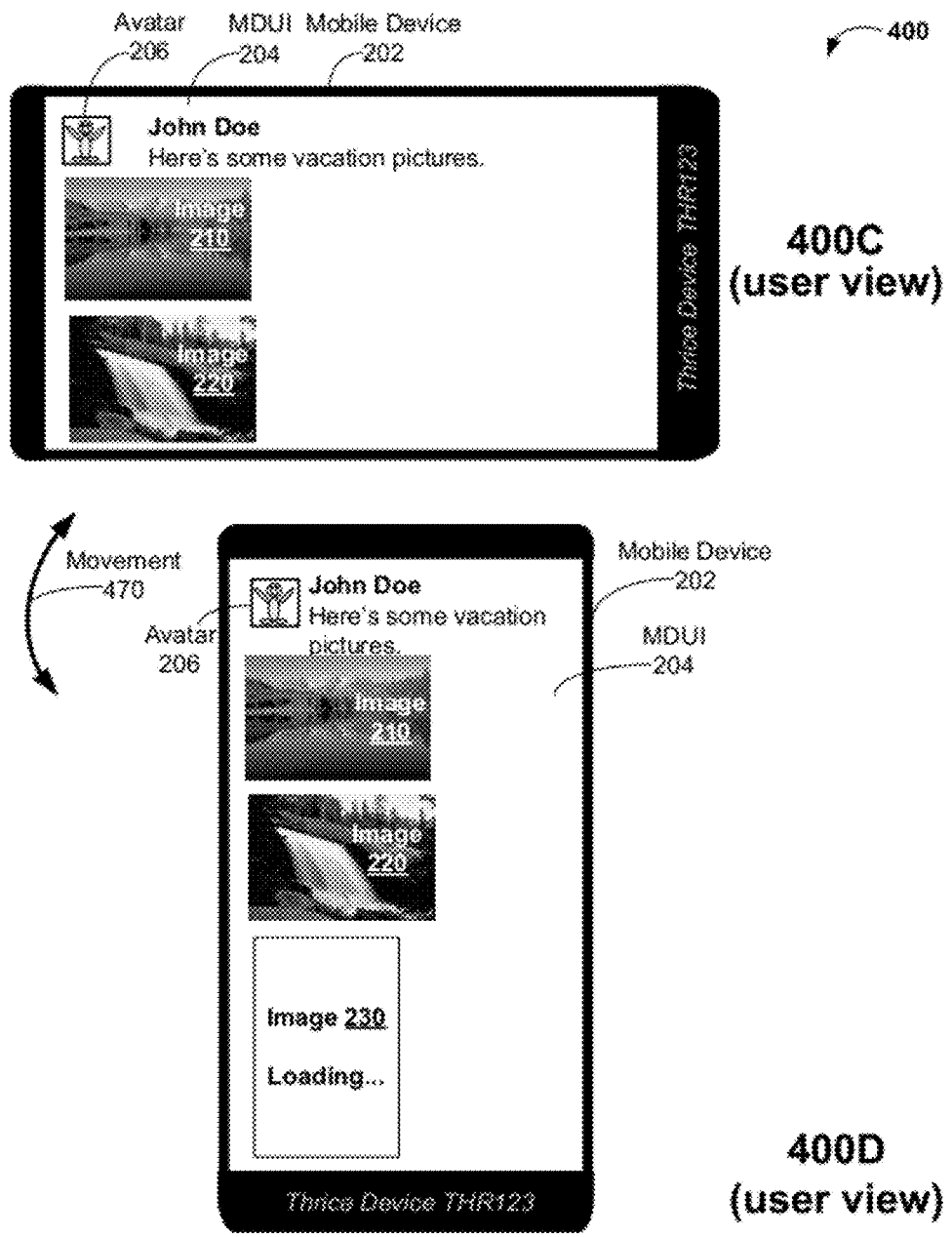

After termination of the cancel_bind( ) entry point, ImageConsumer 420*c*, which was associated with LocalFilePR 442*c*, is now associated with an unloaded image. In some embodiments, application 410 can clear all references to and/or reclaim storage for ImageConsumer 420*c*. In scenario 400, application 410 clears all references to and reclaims the storage for ImageConsumer 420*c* after termination Turning to FIG. 4E, at 400C of scenario 400, movement 460 has concluded. Mobile device 202 remains in landscape orientation with avatar 206, images 210 and 220 being displayed. At 400D of scenario 400, mobile device 202 is then moved by movement 470, which is a rotation gesture that changes the orientation of mobile device 202 from landscape back to portrait. As mobile device 202 has a portrait orientation, image 230 is again visible. At 400D, FIG. 4E shows image 230 being loaded by mobile device user interface 204 and shows avatar 206, images 210 and 220 continuing to be displayed.

Figure 4F:
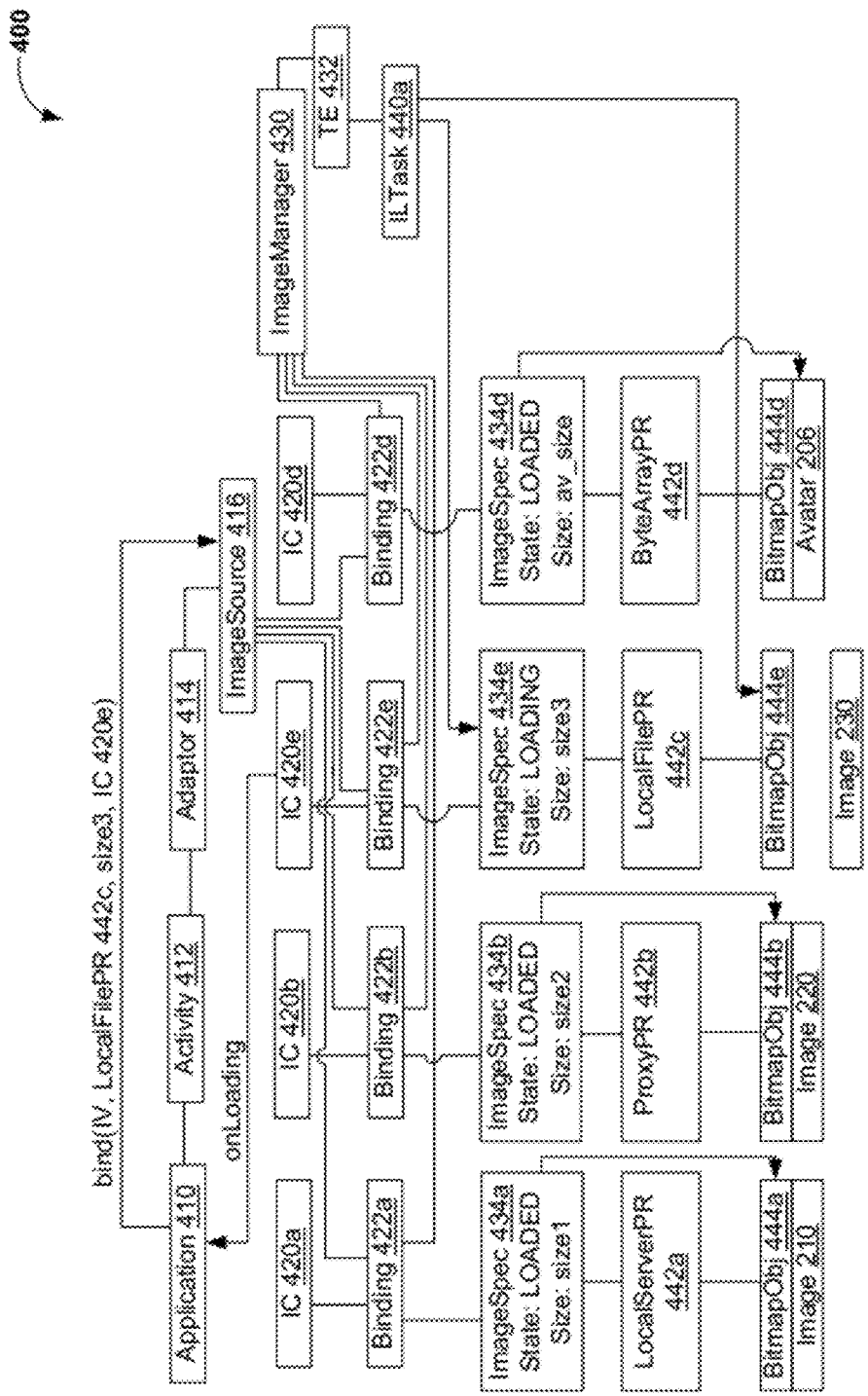

FIG. 4F shows an object view at the end of 400D of scenario 400. As application 410 has determined that image 230 is now visible due to movement 470, and requests loading of image 230. To request loading of image 230, application 410 calls bind( ) entry point of ImageSource 416 as shown at the top of FIG. 4F with "bind(IV, LocalFile PR 442*c*, size3, IC 420*e*)." In response to the bind call to load and display an image represented by LocalFile PR 442*c*, ImageSource 416 can request storage for a new ImageSpec to be ImageSpec 434*d* and for a new Binding to be Binding 422*e*. ImageSource 416 can point a reference to a Binding at Binding 422*e*. ImageSource 416 and/or ImageSpec 434*e* can initialize the new ImageSpec as ImageSpec 434*e* by: pointing a reference to a Binding (in ImageSpec 434*e*) at Binding 422*e*, pointing a reference to a PhotoRef at LocalFile PR 442*c*, setting the LoadState to LOADING, setting a Bitmap Object reference to NULL (e.g., referring to no object), and setting a size parameter to size3.

ImageSource 416 and/or Binding 422*e* can initialize the new Binding as Binding 422*e* by: pointing a reference to an ImageSource at ImageSource 416, pointing a reference to an ImageSpec at ImageSpec 434*e*, pointing a reference to an ImageConsumer at ImageConsumer 420*e*, and pointing a reference to an ImageManager to ImageManager 430. Also, ImageSource 416, Binding 422*e*, and/or ImageManager 430 can point a reference of ImageManager 430 referring to a Binding at Binding 422*e*.

After initializing ImageSpec 434*e* and Binding 422*e*, ImageSource 416 can call the Load entry point of ImageManager 430 with a parameter of ImageSpec 434*e*. In response, ImageManager 430 can request TaskExecutor 432 to allocate a free ImageLoadingTask, and then instruct the free ImageLoadingTask to carry out a loading operation for ImageSpec 434*e*. In scenario 400, TaskExecutor 432 allocates ImageLoadingTask 440*a* to carry out a loading operation for ImageSpec 434*e* via the LoadT entry point of ImageLoadingTask 440*a* with a parameter of ImageSpec434*e*.

In response to the LoadT entry point being called, ImageLoadingTask 440*a* can: (1) set the LoadState of ImageSpec 434*e* to LOADING, (2) call the onImageLoading( ) lifecycle function of ImageConsumer 420*e*, (3) retrieve the size parameter from ImageSpec 434*e* as size3 and (4) call the makeBitmapObj( ) entry point of LocalFilePR 442*c* with size3 as a parameter, via use of the PhotoRef reference of ImageSpec 434*e*. In scenario 400, the makeBitmapObj( ) entry of LocalServerPR 442*a* creates BitmapObj 444*e*, allocates image memory to store an image of at least size size3, decodes, and loads image data for image 230 into the allocated image memory, thereby preparing image 230 for display. ImageLoadingTask 440*a* can store a return value of either a reference to BitmapObj 444*e* when makeBitmapObj( ) is successful or a NULL pointer when makeBitmapObj( ) is not successful. In scenario 400, makeBitmapObj( ) for BitmapObj 444*e* is successful. Then, ImageLoadingTask 440*a* can set a reference to a BitmapObj in ImageSpec 434*e* equal to a reference to BitmapObj 444*e*.

In response to the onImageLoading( ) lifecycle function of ImageConsumer 420*e*, as part of the onImageLoading( ) lifecycle function of ImageConsumer 420*e*, or some other function, a "Loading . . . " placeholder image for image 230 can be displayed using mobile device user interface 204, perhaps by application 410 requesting display of the placeholder image, such as shown in FIG. 4E.

Figure 4G:
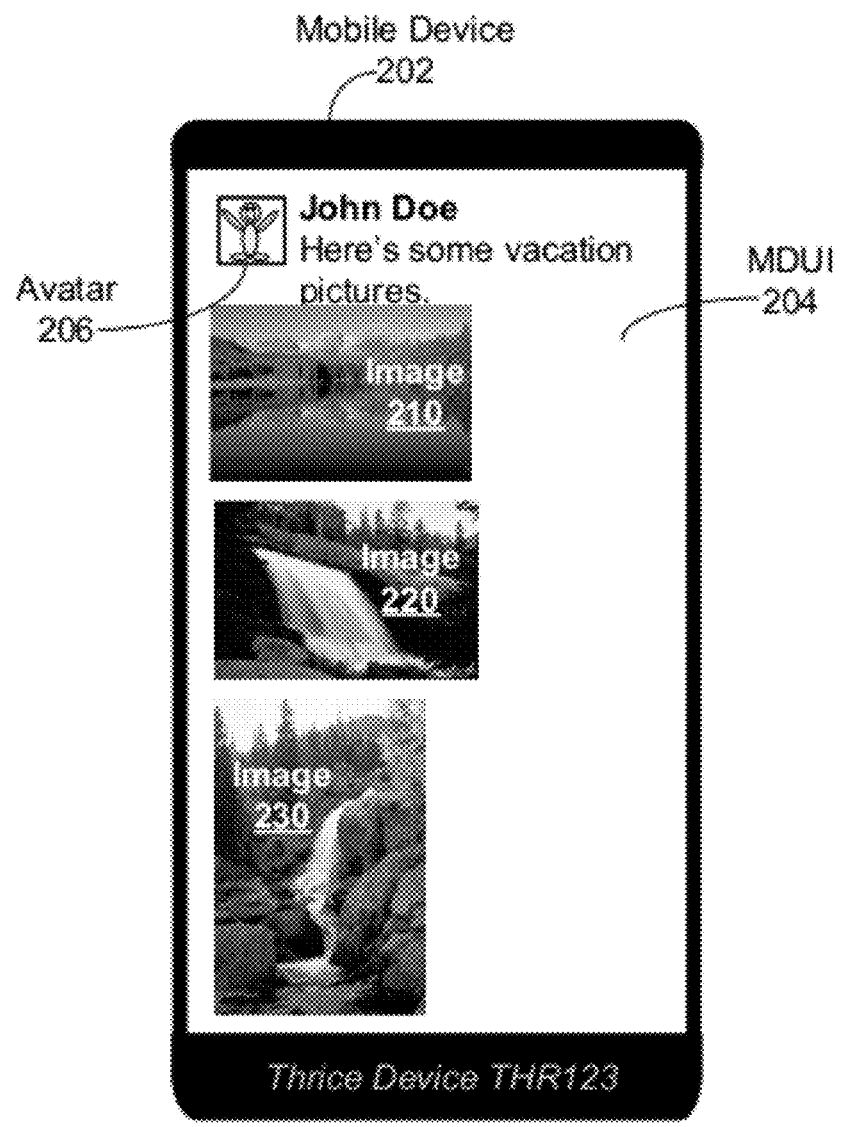

FIG. 4G shows that, at 400E of scenario 400, movement 470 has concluded. Also, image 230 has completed loading and is being displayed on mobile device 202, while avatar 206, image 210, and image 220 continue to be displayed.

Figure 4H:
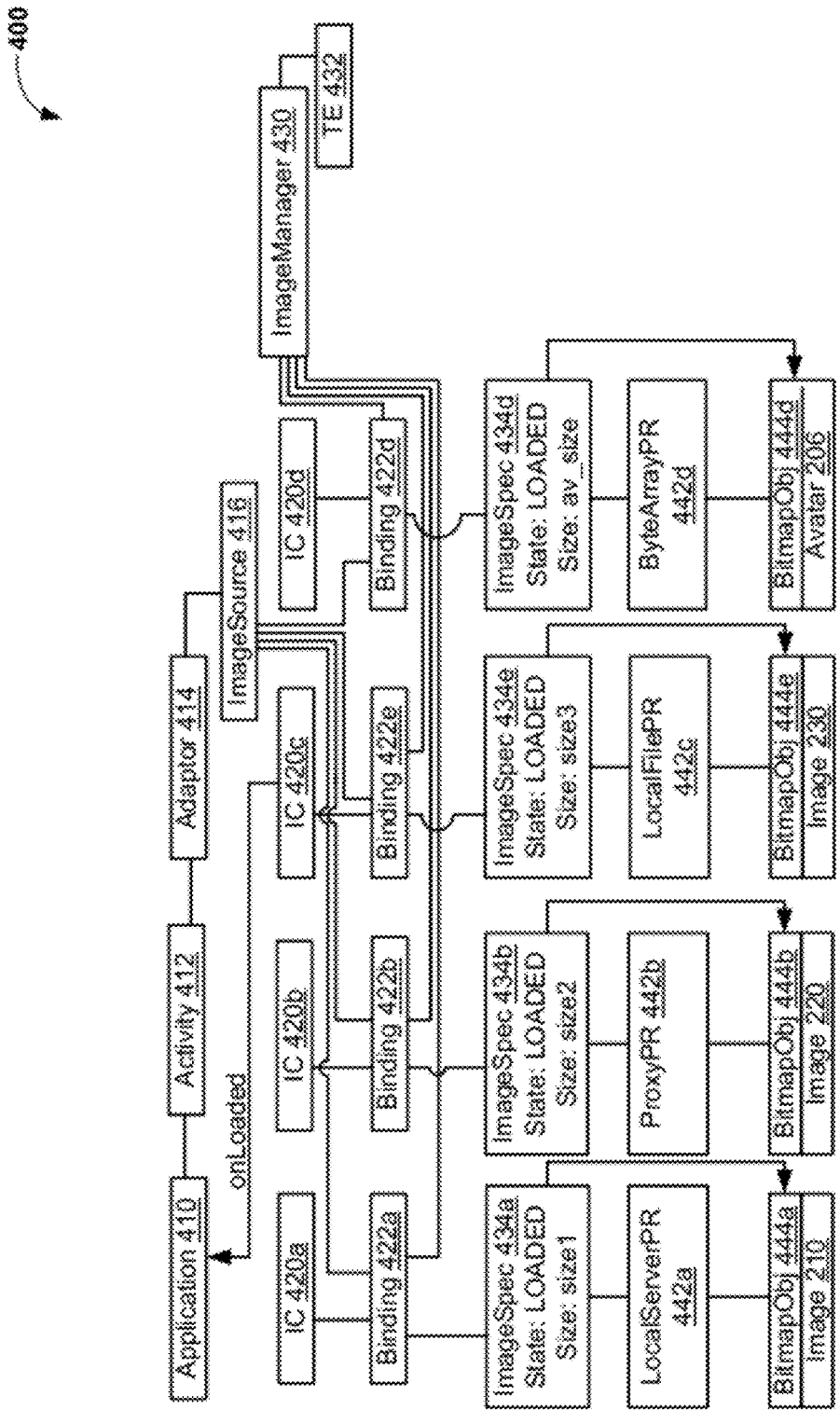

FIG. 4H shows an object view at the end of 400E of scenario 400. Regarding the loading of image 230, in scenario 400, the makeBitmapObj( ) entry point of BitmapObj 444*e* returned successfully to ImageLoadingTask 440*a* (not shown in FIG. 4H). FIG. 4H shows that BitmapObj 444*e* is associated with image memory storing image 230. Upon successful completion of the makeBitmapObj( ) entry point for BitmapObj 444*e*, ImageLoadingTask 440*a* can set the LoadState for ImageSpec 434*e* to LOADED and call the onImage- Loaded( ) lifecycle function of ImageConsumer 420e. After calling onImageLoaded( ) ImageLoadingTask 440a can complete execution of entry point LoadT for LocalFilePR 442c.

In response to the onImageLoaded( ) lifecycle function call from ImageConsumer 420e for LocalFilePR 442c, application 410 can request mobile device user interface 204 to display image 230. In other embodiments, ImageLoadingTask 440a can request mobile device user interface 204 to display image 230 prior to completion of the LoadT entry point, and perhaps prior to calling onImageLoaded( ).

Example Data Network

Figure 5:
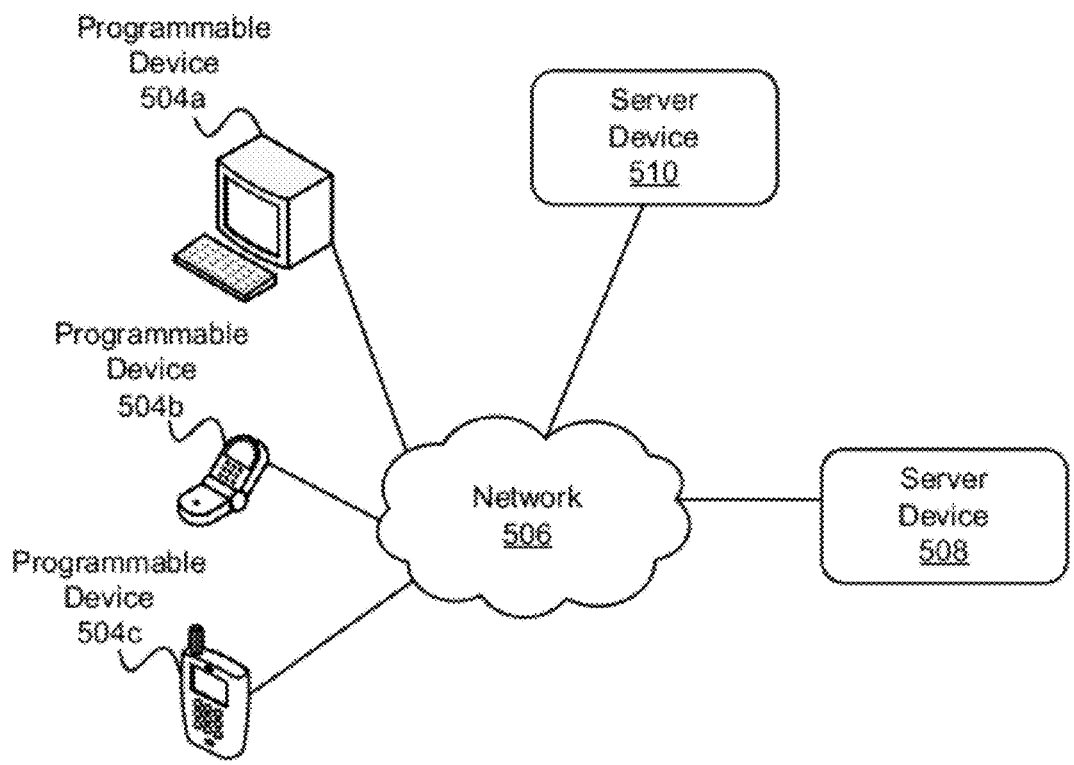
FIG. 5 depicts a distributed computing architecture, in accordance with an example embodiment.

FIG. 5 shows server devices 508, 510 configured to communicate, via network 506, with programmable devices 504a, 504b, and 504c. Network 506 may correspond to a LAN, a wide area network (WAN), a corporate intranet, the public Internet, or any other type of network configured to provide a communications path between networked computing devices. The network 506 may also correspond to a combination of one or more LANs, WANs, corporate intranets, and/or the public Internet.

Although FIG. 5 only shows three programmable devices, distributed application architectures may serve tens, hundreds, or thousands of programmable devices. Moreover, programmable devices 504a, 504b, and 504c (or any additional programmable devices) may be any sort of computing device, such as an ordinary laptop computer, desktop computer, network terminal, wireless communication device (e.g., a cell phone or smart phone), and so on. In some embodiments, programmable devices 504a, 504b, and 504c may be dedicated to the design and use of software applications. In other embodiments, programmable devices 504a, 504b, and 504c may be general purpose computers that are configured to perform a number of tasks and need not be dedicated to software development tools. In still other embodiments, programmable devices 504a, 504b, and/or 504c can be configured to perform some or all of the herein-described functionality of mobile device 202.

Server devices 508, 510 can be configured to perform one or more services, as requested by programmable devices 504a, 504b, and/or 504c. For example, server device 508 and/or 510 can provide content to programmable devices 504a-504c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 508 and/or 510 can provide programmable devices 504a-504c with access to software for database, search, computation, graphical, audio, video, World Wide Web/Internet utilization, and/or other functions. Many other examples of server devices are possible as well.

Computing Device Architecture

Figure 6A:
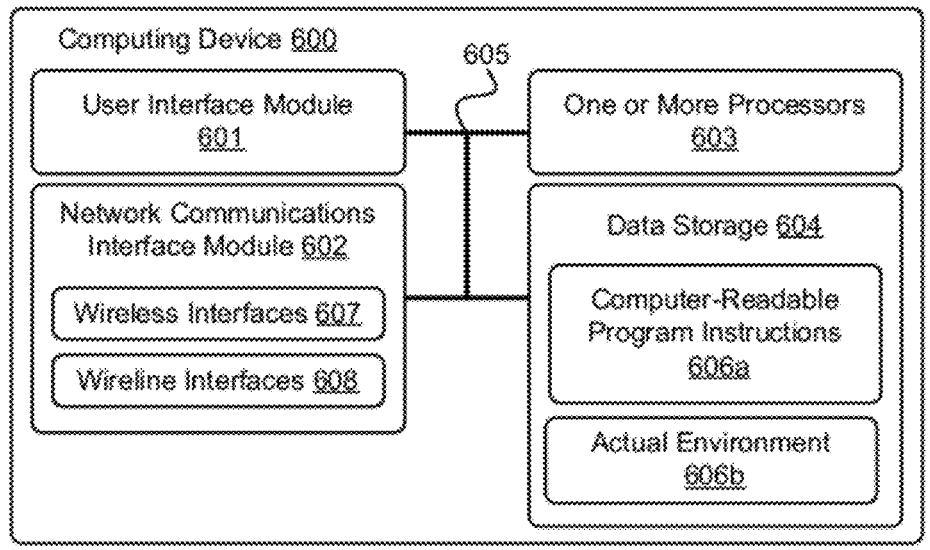
FIG. 6A is a block diagram of a computing device, in accordance with an example embodiment.

FIG. 6A is a block diagram of a computing device (e.g., system) in accordance with an example embodiment. In particular, computing device 600 shown in FIG. 6A can be configured to perform one or more functions of mobile device 202, server devices 508, 510, network 506, and/or one or more of programmable devices 504a, 504b, and 504c. Computing device 600 may include a user interface module 601, a network-communication interface module 602, one or more processors 603, and data storage 604, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network, such as network 506 shown in FIG. 5. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 603 can include one or more general purpose processors and/or one or more special purpose processors (e.g., digital signal processors, application specific integrated circuits, etc.). Processors 603 can be configured to execute computer-readable program instructions 606a that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606a, actual environment 606b, and perhaps additional data. Actual environment 606b can store at least some of the data used by one or more processes and/or threads of a software application. In some embodiments, data storage 604 can additionally include storage required to perform at least part of the herein-described methods and techniques and/or at least part of the functionality of the herein-described devices and networks.

Cloud-Based Servers

Figure 6B:
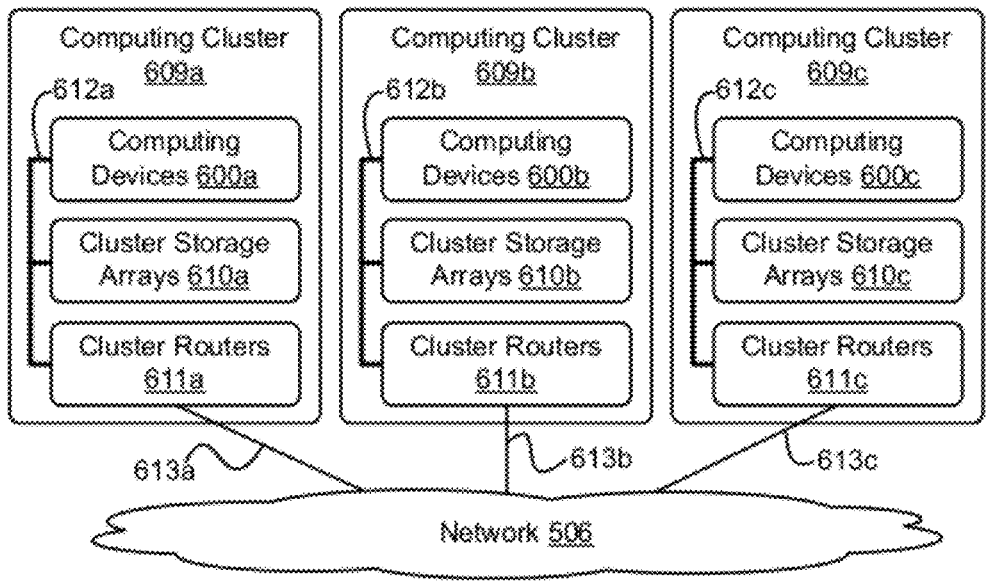
FIG. 6B depicts a cloud-based server system, in accordance with an example embodiment.

FIG. 6B depicts a network 506 of computing clusters 609a, 609b, 609c arranged as a cloud-based server system in accordance with an example embodiment. Server devices 508 and/or 510 can be cloud-based devices that store program logic and/or data of cloud-based applications and/or services. In some embodiments, server devices 508 and/or 510 can be a single computing device residing in a single computing center. In other embodiments, server device 508 and/or 510 can include multiple computing devices in a single computing center, or even multiple computing devices located in multiple computing centers located in diverse geographic locations. For example, FIG. 5 depicts each of server devices 508 and 510 residing in different physical locations.

In some embodiments, data and services at server devices 508 and/or 510 can be encoded as computer readable information stored in non-transitory, tangible computer readable media (or computer readable storage media) and accessible by programmable devices 504a, 504b, and 504c, and/or other computing devices. In some embodiments, data at server device 508 and/or 510 can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, the functions of server device 508 and/or 510 can be distributed among three computing clusters 609a, 609b, and 608c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of electronic communications server 512. In one embodiment, the various functionalities of electronic communications server 512 can be distributed among one or more of computing devices 600a, 600b, and 600c. Computing devices 600b and 600c in computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with server devices 508 and/or 510 can be distributed across computing devices 600a, 600b, and 600c based at least in part on the processing requirements of server devices 508 and/or 510, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 508 and/or 510 can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store the data of server device 508, while other cluster storage arrays can store data of server device 510. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 601a via the local cluster network 612a, and (ii) wide area network communications between the computing cluster 609a and the computing clusters 609b and 609c via the wide area network connection 613a to network 506. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design goals of the moderation system architecture.

Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   sending a request from an application executing on a computing device to load a plurality of images in parallel onto the computing device;
   receiving the request at an image loader executing on the computing device;
   in response to the request, loading, in parallel, the plurality of images into storage of the computing device using the image loader, wherein a current state of each image of the plurality of images is set to a loading state;
   while loading:
      determining, by the application, that an image of the plurality of images is not to be used, and
      requesting that loading of the not-used image be canceled; and
   for each image in the plurality of images, the image loader:
      determining whether the loading of the image is requested to be canceled,
      in response to determining that the loading of the image is not requested to be canceled:
         marking the current state of the image as loaded and displaying the image, and
      in response to determining that the loading of the image is requested to be canceled:
         marking the current state of the image as no-image and
         recycling storage allocated for the image.

2. The method of claim 1, further comprising:
   sending a second request from a second application executing on the computing device to load a second plurality of images in parallel onto the computing device, wherein the second request differs from the request, and wherein the second application differs from the application;
   receiving the second request at the image loader before the image loader has loaded the plurality of images; and
   in response to the second request, the image loader loading both the plurality of images and the second plurality of images in parallel into respective storage of the computing device.

3. A method, comprising:
   receiving, using a computing device, a request to display a plurality of images on the computing device;
   in response to the request, loading, in parallel, the plurality of images into storage of the computing device;
   determining whether an image of the plurality of images is to be used using the computing device;
   in response to determining that the image is to be used, the computing device marking the image as loaded;
   in response to determining that the image is not to be used, the computing device marking the image as no-image; and
   providing for display only images marked as loaded using the computing device.

4. The method of claim 3, wherein the plurality of images comprises an image stored as an array on the computing device.

5. The method of claim 3, wherein the plurality of images comprises an image stored as a file on the computing device.

6. The method of claim 3, wherein the plurality of images comprises an image accessible via a uniform resource locator (URL).

7. The method of claim 6, wherein the image accessible via the URL comprises an image accessible via an imaging proxy server.

8. The method of claim 6, wherein the URL comprises a size parameter for the image accessible via the URL.

9. The method of claim 8, further comprising:
   the computing device requesting delivery of the image of a pre-determined size by specifying the size parameter for the image;
   in response, receiving the requested image having the pre-determined size at the computing device.

10. The method of claim 3, further comprising:
in response to marking the image as no-image, the image loader recycling storage allocated for the marked image.

11. The method of claim 10, further comprising:
after recycling storage allocated for the marked image, receiving a second request to display the marked image on the computing device; and
in response to the second request, the computing device:
generating an image specification for the marked image, the image specification comprising a state of the marked image;
initiating loading of the marked image into the storage of the computing device;
setting the state of the marked image as loading;
determining that the marked image is to be used; and
in response to determining that the image is to be used and that loading of the marked image is complete, setting the state of the marked image as loaded and providing the marked image for display.

12. The method of claim 3, wherein the request comprises a callback software function for the image, and
wherein marking the image as no-image comprises deleting the callback software function for the image.

13. The method of claim 3, wherein in response to determining that the image is not to be used by the application, canceling an in-progress loading of the image.

14. An article of manufacture including a non-transitory computer-readable storage medium having instructions stored thereon that, when executed by a processor, cause the processor to perform functions comprising:
receiving a request to display a plurality of images;
loading the plurality of images, in parallel into storage associated with the processor;
determining whether an image is to be used;
in response to determining that the image is to be used, marking the image as loaded;
in response to determining that the image is not to be used, marking the image as no-image; and
providing for display only images marked as loaded.

15. The article of manufacture of claim 14, wherein the plurality of images comprises an image stored as an array.

16. The article of manufacture of claim 14, wherein the plurality of images comprises an image stored as a file.

17. The article of manufacture of claim 14, wherein the plurality of images comprises an image accessible via a uniform resource locator (URL).

18. The article of manufacture of claim 14, wherein the functions further comprise:
in response to marking the image as no-image, recycling storage allocated for the marked image.

19. The article of manufacture of claim 18, wherein the functions further comprise:
after recycling storage allocated for the marked image, receiving a second request to display the marked image; and
in response to the second request:
generating an image specification for the marked image, the image specification comprising a state of the marked image;
initiating loading of the marked image into the storage associated with the processor;
setting the state of the marked image as loading;
determining that the marked image is to be used; and
in response to determining that the image is to be used and that loading of the marked image is complete, setting the state of the marked image as loaded and providing the marked image for display.

20. The article of manufacture of claim 14, wherein in response to determining that the image is not to be used, canceling an in-progress loading of the image.

* * * * *